United States Patent
Sunaoshi et al.

(10) Patent No.: US 12,435,235 B2
(45) Date of Patent: Oct. 7, 2025

(54) AQUEOUS INKJET INK AND PRINTED MATTER

(71) Applicants: artience Co., Ltd., Tokyo (JP); TOYOCOLOR CO., LTD., Tokyo (JP)

(72) Inventors: Kazushi Sunaoshi, Tokyo (JP); Takanori Nomura, Tokyo (JP); Riho Morita, Tokyo (JP)

(73) Assignees: Artience Co., Ltd., Tokyo (JP); TOYOCOLOR CO., LTD., Tokyo (JP)

(*) Notice: Subject to any disclaimer, the term of this patent is extended or adjusted under 35 U.S.C. 154(b) by 0 days.

(21) Appl. No.: 18/879,576

(22) PCT Filed: Mar. 28, 2024

(86) PCT No.: PCT/JP2024/012837
§ 371 (c)(1),
(2) Date: Dec. 27, 2024

(87) PCT Pub. No.: WO2025/109774
PCT Pub. Date: May 30, 2025

(65) Prior Publication Data
US 2025/0257232 A1    Aug. 14, 2025

(30) Foreign Application Priority Data
Nov. 22, 2023    (JP) ................. 2023-198145

(51) Int. Cl.
C09D 11/38    (2014.01)
C09D 11/033    (2014.01)

(52) U.S. Cl.
CPC ............ C09D 11/38 (2013.01); C09D 11/033 (2013.01)

(58) Field of Classification Search
None
See application file for complete search history.

(56) References Cited

U.S. PATENT DOCUMENTS

| | | | |
|---|---|---|---|
| 3,268,593 A | 8/1966 | Carpenter et al. | |
| 6,455,234 B1 | 9/2002 | Lassila et al. | |
| 9,284,465 B2 * | 3/2016 | Yamazaki | C08K 5/053 |
| 10,316,207 B2 * | 6/2019 | Mitsuyoshi | C09D 11/322 |
| 2009/0233059 A1 * | 9/2009 | Ota | C09D 11/38 |
| | | | 524/378 |
| 2015/0284577 A1 | 10/2015 | Kondo et al. | |
| 2015/0337149 A1 | 11/2015 | Wakabayashi et al. | |
| 2021/0086539 A1 | 3/2021 | Oki | |

FOREIGN PATENT DOCUMENTS

| | | |
|---|---|---|
| EP | 3 733 791 A1 | 11/2020 |
| JP | 2001-215690 A | 8/2001 |
| JP | 2002-356451 A | 12/2002 |
| JP | 2014-139004 A | 7/2014 |
| JP | 2018-70730 A | 5/2018 |
| JP | 2019-119787 A | 7/2019 |
| JP | 2019-167492 A | 10/2019 |
| JP | 2019-167493 A | 10/2019 |
| JP | 2019-214723 A | 12/2019 |
| JP | 2021-45926 A | 3/2021 |
| JP | 2021-147400 A | 9/2021 |
| JP | 2022-131136 A | 9/2022 |
| JP | 2022-151398 A | 10/2022 |

OTHER PUBLICATIONS

International Search Report for PCT/JP2024/012837 dated May 28, 2024.
Written Opinion for PCT/JP2024/012837 dated May 28, 2024.

* cited by examiner

*Primary Examiner* — Vu A Nguyen
(74) *Attorney, Agent, or Firm* — Sughrue Mion, PLLC

(57) ABSTRACT

An embodiment of the present invention relates to an aqueous inkjet ink containing a pigment, a binder resin, a water-soluble organic solvent, an unmodified acetylene diol-based surfactant (A1), and an alkylene oxide-modified acetylene diol-based surfactant (A2) having an HLB value of 4 to 10, wherein contents of the unmodified acetylene diol-based surfactant (A1) and the alkylene oxide-modified acetylene diol-based surfactant (A2) are defined, and a ratio between the content of the unmodified acetylene diol-based surfactant (A1) and the content of the alkylene oxide-modified acetylene diol-based surfactant (A2) is 10 to 5,000.

6 Claims, No Drawings

AQUEOUS INKJET INK AND PRINTED MATTER

CROSS REFERENCE TO RELATED APPLICATIONS

This application is a National Stage of International Application No. PCT/JP2024/012837 filed Mar. 28, 2024, claiming priority based on Japanese Patent Application No. 2023-198145 filed Nov. 22, 2023.

TECHNICAL FIELD

An embodiment of the present invention relates to an aqueous inkjet ink and a printed matter manufactured using the aqueous inkjet ink.

BACKGROUND ART

Along with printing in smaller lots and diversification of market needs, the spread of digital printing methods is rapidly progressing. The digital printing methods do not require a plate, and therefore can cope with small-lot printing, can reduce cost related to printing, and can downsize printing apparatuses.

An inkjet printing method, which is a type of digital printing methods, is a method in which microdroplets of ink are caused to fly and land on a printing substrate (also simply referred to as a "substrate" in the present specification) from an inkjet head, and an image and/or text (hereinafter, also collectively referred to as "printed matter". Note that the "image" includes a seamless image, such as a solid image or a checkered image.) is formed on the printing substrate. Compared to other digital printing methods, the inkjet printing method is excellent in terms of size and cost of printing apparatuses, ease of full-color printing, and the like, and in recent years, the inkjet printing method has been increasingly used also in industrial printing applications.

An ink used in the inkjet printing method is in a wide variety of forms, such as an oil-based ink, a solvent-based ink, an active energy ray-curable ink, and a water-based ink. A solvent-based ink or an active energy ray-curable ink has hitherto been used in industrial printing applications. However, in recent years, a demand for a water-based ink has increased from the viewpoints of consideration, response, and the like to the influence on the environment and humans (for example, Patent Literatures 1 to 4).

CITATION LIST

Patent Literature

Patent Literature 1: JP 2022-151398 A
Patent Literature 2: JP 2021-147400 A
Patent Literature 3: JP 2018-70730 A
Patent Literature 4: JP 2014-139004 A

SUMMARY OF INVENTION

Technical Problem

In addition, in recent years, as a destination for the development of a water-based ink (referred to as an "aqueous inkjet ink" in the present specification, and also simply referred to as "ink" hereinafter) used in the inkjet printing method, demands for the packaging market is increasing. In the packaging market, printing is performed on printing substrates, such as paper containers, labels, or packaging films. In addition, as a material of these printing substrates, there are low-absorbent materials, such as coated paper and art paper, and non-absorbent materials, such as a polypropylene film, a polyethylene terephthalate film, and a nylon film. Therefore, in developing the aqueous inkjet ink in the packaging market, it is required to be able to manufacture a printed matter having excellent color reproducibility and printed image quality, and further having a characteristic capable of withstanding practical use even for a low-absorbent substrate and a non-absorbent substrate.

On the other hand, most of the aqueous inkjet inks that have existed so far are for performing printing on a high-absorbent substrate, such as plain paper or dedicated paper. When such an aqueous inkjet ink is used particularly for a non-absorbent substrate, the aqueous inkjet ink does not permeate into the substrate to be absorbed. Therefore, droplets of the aqueous inkjet ink that have landed on the substrate do not sufficiently dry, and a phenomenon (beading) where the droplets attract each other and coalesce occurs. When beading occurs, deterioration of solid filling (occurrence of a site not covered with ink in a printed matter with a coverage rate of 100%), density unevenness, mixed color bleeding, and the like occur, and thus printed image quality deteriorates significantly.

As a method to prevent the beading, a method for reducing a surface tension of an aqueous inkjet ink is known. In addition, a surfactant is often used as a material for reducing the surface tension. In particular, in order to sufficiently lower the surface tension of the aqueous inkjet ink immediately after the aqueous inkjet ink lands on a printing substrate, it is preferable to select a compound having a small molecular weight and a high orientation rate to a droplet surface (gas-liquid interface) as the surfactant. However, in general, such a surfactant is not easily compatible with water, and thus, for example, in an aqueous inkjet ink present in the vicinity of a nozzle of an inkjet head, there is a possibility that the surfactant is intensively present at a gas-liquid interface and oriented. When this happens, the surface tension of the aqueous inkjet ink present in the vicinity of the nozzle locally decreases, and a phenomenon where the aqueous inkjet ink overflows from the nozzle to the outside occurs. In particular, occurrence and progress of such an ink overflow from a nozzle during continuous discharge causes discharge failure (deterioration of continuous discharge performance), such as nozzle failures or flight deflection.

In addition, a surfactant having a low molecular weight and a high orientation rate is more present on a droplet surface, that is, a surface of a layer (ink layer) formed by drying the printed ink. Therefore, for example, when a printed matter is wound and stored, blocking (a phenomenon where a part of an ink layer is stripped off by a printing substrate when peeling off the printing substrate attached to the ink layer) may occur.

Furthermore, when a laminated body including an ink layer in inner layers is manufactured and used as a package, such as a pouch (bag), a surfactant having a low molecular weight and a high orientation rate, which is present on a surface of the ink layer and/or is bleeding (a phenomenon where a certain component bleeds out to a layer surface over time) to the surface of the ink layer, may pass through the layers constituting the laminated body and reach a surface of the laminated body (migration). In particular, when the surfactant migrates to a surface in contact with a content, safety of the content may be adversely affected, and thus, for example, when the laminated body is used in food packaging applications or cosmetic packaging applications, the migration may cause problems.

As described above, conventionally, it has been extremely difficult to simultaneously solve all aspects, that is, improvement in printed image quality, the continuous discharge performance, the blocking resistance, and the migration resistance.

As an example of preventing beading when printing is performed on a low-absorbent substrate or a non-absorbent substrate by controlling the type and/or amount of a surfactant, Patent Literature 1 discloses an ink composition (set) in which a silicon-based surfactant having a specific structure and a nonionic surfactant (for example, a polyoxyalkylene alkyl ether-based surfactant such as "Lutensol XL40" manufactured by BASF Japan Ltd. or "GENAPOL EP2564" manufactured by Clariant Japan Ltd.) having an HLB value of 6.0 or more and less than 12.0 are used in combination; Patent Literature 2 discloses an ink containing a polyoxyalkylene alkyl ether-based surfactant having a specific structure and an HLB value determined by actual measurement of 5.0 to 13.0; and Patent Literature 3 discloses an ink in which a silicone (silicon)-based surfactant and a fluorine-based surfactant are used in combination with a glycol ether-based organic solvent. On the other hand, in Patent Literatures 1 to 3, a low-absorbent substrate such as coated paper is specifically used for evaluation of beading. As described above, when an aqueous inkjet ink is printed on a non-absorbent substrate, such as a resin film, the aqueous inkjet ink does not permeate into the substrate at all, and thus beading is more likely to occur than when the aqueous inkjet ink is printed on a low-absorbent substrate. The aqueous inkjet inks specifically disclosed in Patent Literatures 1 to 3 are not sufficient in improving beading when being printed on a non-absorbent substrate.

In addition, Patent Literature 4 discloses an ink jet recording method using a water-based ink containing a specific acetylene glycol (acetylene diol-based surfactant) and a nonionic surfactant, and defining the blending amounts and blending ratios of the components. In addition, in a main example of the water-based ink specifically disclosed in Patent Literature 4, 2,4,7,9-tetramethyl-5-decine-4,7-diol is used as the acetylene glycol, and a polyoxyalkylene alkyl ether-based surfactant, such as polyoxyethylene lauryl ether (the number of added moles of ethylene oxide groups: 12), is used as the nonionic surfactant. Here, since the 2,4,7,9-tetramethyl-5-decine-4,7-diol corresponds to the "compound having a small molecular weight and a high orientation rate to a droplet surface (gas-liquid interface)", the water-based ink is considered to be effective in preventing beading. On the other hand, in Patent Literature 4, in particular, blocking resistance and migration resistance are not sufficiently studied, and actually, the blocking resistance and the migration resistance of the water-based ink are not favorable.

An embodiment of the present invention has been made in order to solve the above problems, and an object of the present invention is to provide an aqueous inkjet ink that can stably obtain a printed matter free from beading and excellent in blocking resistance and migration resistance even when the aqueous inkjet ink is printed on a low-absorbent printing substrate, and also has good continuous discharge performance. Another embodiment of the present invention is to provide a printed matter that is free from beading and is also excellent in blocking resistance and migration resistance even when printing is performed on a low-absorbent printing substrate.

Solution to Problem

As a result of intensive studies, the present inventors have found that all of the above-described problems can be solved simultaneously at a high level by using an aqueous inkjet ink having the following composition.

That is, an embodiment of the present invention relates to an aqueous inkjet ink containing a pigment, a binder resin, a water-soluble organic solvent, and an acetylene diol-based surfactant (A), wherein the acetylene diol-based surfactant (A) contains an unmodified acetylene diol-based surfactant (A1) and an alkylene oxide-modified acetylene diol-based surfactant (A2) having an HLB value of 4 to 10, the content of the unmodified acetylene diol-based surfactant (A1) is 5 to 2,000 ppm with respect to the total amount of the aqueous inkjet ink, the content of the alkylene oxide-modified acetylene diol-based surfactant (A2) is 0.2 to 5% by mass with respect to the total amount of the aqueous inkjet ink, and a ratio between the content of the unmodified acetylene diol-based surfactant (A1) and the content of the alkylene oxide-modified acetylene diol-based surfactant (A2) [surfactant (A2)/surfactant (A1)] is within a range of 10 to 5,000.

Another embodiment of the present invention relates to a printed matter obtained by printing an aqueous inkjet ink on a printing substrate.

Advantageous Effects of Invention

According to an embodiment of the present invention, it is possible to provide an aqueous inkjet ink that can stably obtain a printed matter free from beading and excellent in blocking resistance and migration resistance even when the aqueous inkjet ink is printed on a low-absorbent printing substrate, and also has good continuous discharge performance. According to another embodiment of the present invention, it is possible to provide a printed matter that is free from beading and is also excellent in blocking resistance and migration resistance even when printing is performed on a low-absorbent printing substrate.

DESCRIPTION OF EMBODIMENTS

Hereinafter, an aqueous inkjet ink according to an embodiment of the present invention (hereinafter, also simply referred to as "ink of the present invention") and a printed matter obtained by printing the aqueous inkjet ink will be described. Note that the present invention is not limited to the following description, and includes various modifications performed without departing from the gist of the invention.

In general, water, which is a main solvent of an aqueous inkjet ink, has a high surface tension, and therefore it does not easily get wet-spread on a printing substrate. In addition, when a droplet of the aqueous inkjet ink that has landed on the printing substrate has a high surface tension and comes into contact with an adjacent undried droplet in an undried state, a force acts on each of the droplets in a direction of reducing its surface area, and therefore the droplets are attracted to each other to cause beading. As described above, when beading occurs, deterioration of solid filling, density unevenness, mixed color bleeding, and the like also occur, and printed image quality deteriorates significantly.

In addition, as a method to prevent beading, it is preferable to use a surfactant having a small molecular weight and a high orientation rate to a droplet surface (gas-liquid interface). However, since such a surfactant is not easily compatible with water, for example, in an aqueous inkjet ink present in the vicinity of a nozzle of an inkjet head, there is a possibility that a phenomenon occurs in which the surfactant is intensively present at a gas-liquid interface and oriented, and the ink overflows from the nozzle to the outside. Such a phenomenon deteriorates continuous discharge performance.

Furthermore, a surfactant having a low molecular weight and a high orientation rate is more present on a surface of an ink layer. Therefore, blocking may occur due to motions and the like of surfactant molecules caused by heat or humidity. In addition, the surfactant may bleed to a surface of a laminated body including the ink layer, thereby causing migration.

On the other hand, if the amount used of the surfactant having a low molecular weight and a high orientation rate is reduced in order to prevent deterioration of continuous discharge performance, and occurrence of blocking and migration, the occurrence of the above-described beading cannot be prevented this time, and it will be difficult to obtain a printed matter having favorable printed image quality.

As described above, a surfactant having a low molecular weight and a high orientation rate is effective for improving printed image quality, but has a trade-off with characteristics such as continuous discharge performance, blocking resistance, and migration resistance.

Therefore, as a result of intensive studies by the present inventors to solve the above trade-off, the present inventors have found that an unmodified acetylene diol-based surfactant (A1) and an alkylene oxide-modified acetylene diol-based surfactant (A2) having a specific HLB value should be used in combination at a specific ratio, and the amounts of the unmodified acetylene diol-based surfactant (A1) and the alkylene oxide-modified acetylene diol-based surfactant (A2) should also be defined, leading to the present invention. Although details of a mechanism by which the above-described problems can be preferably solved by the aqueous inkjet ink having the above composition are unclear, the present inventors presume the mechanism as follows.

First, the ink of the present invention contains an acetylene diol-based surfactant. In general, a bond of an acetylene group contained in the acetylene diol-based surfactant does not rotate. Therefore, the acetylene diol-based surfactant is less likely to deform its molecular structure as compared with a surfactant including only a single bond, for example, a polyoxyethylene alkyl ether-based surfactant, and thus exhibits an effect as expected, even when the acetylene diol-based surfactant is added in a small amount.

In addition, the ink of the present invention contains, as the acetylene diol-based surfactant, an unmodified acetylene diol-based surfactant (A1) and an alkylene oxide-modified acetylene diol-based surfactant (A2) having an HLB value of 4 to 10. Out of these, the unmodified acetylene diol-based surfactant (A1) corresponds to the above-described "surfactant having a low molecular weight and a high orientation rate", and is an essential material in the case of the ink of the present invention from the viewpoint of preventing beading. In addition, in the ink of the present invention, the content of the unmodified acetylene diol-based surfactant (A1) is within a range of 5 to 2,000 ppm in the total amount of the ink from the viewpoint that not only prevention of beading but also continuous discharge performance, and blocking resistance and migration resistance of a printed matter are all in a favorable state by using the unmodified acetylene diol-based surfactant (A1) in combination with other materials described later.

Furthermore, in the ink of the present invention, the alkylene oxide-modified acetylene diol-based surfactant (A2) having an HLB value of 4 to 10 is used so as to be within a range of 0.2 to 5% by mass in the ink and 10 to 5,000 times the content of the unmodified acetylene diol-based surfactant (A1). Although the detailed principle is not clear, when the alkylene oxide-modified acetylene diol-based surfactant (A2) is used in the above content and ratio, the alkylene oxide-modified acetylene diol-based surfactant (A2) forms an emulsion state with the unmodified acetylene diol-based surfactant (A1) which has a similar structure, and excessive orientation of the unmodified acetylene diol-based surfactant (A1) is suppressed. In addition, since the amount itself of the unmodified acetylene diol-based surfactant (A1), which is a surfactant having a low molecular weight, is small, the ink of the present invention can prevent deterioration of continuous discharge performance, and can obtain a printed matter and a laminated body in which blocking and migration do not easily occur.

Furthermore, some molecules of the unmodified acetylene diol-based surfactants (A1) are present at a gas-liquid interface together with the alkylene oxide-modified acetylene diol-based surfactant (A2) forming an emulsified state, and are oriented. As a result, in the ink of the present invention, an effect equal to or more than that achieved by the amount of the unmodified acetylene diol-based surfactant (A1) added to the ink is exhibited, and beading can be further prevented.

As described above, in order to solve the above-described problems simultaneously at a high level, the ink having the composition of the present invention is indispensable.

Note that the ink of the present invention can further use a nonionic surfactant (B) other than the acetylene diol-based surfactant in addition to the acetylene diol-based surfactant described above. The nonionic surfactant (B) can be expected to have an effect of largely reducing a static surface tension. Therefore, it is considered that the nonionic surfactant (B) effectively functions in a time domain after "several tens of milliseconds elapse from the time when an ink droplet lands on a printing substrate", which is a time domain in which the unmodified acetylene diol-based surfactant (A1) mainly functions. Since a behavior in this time domain mainly affects wet-spreading, and improvement in image density, it is possible to remarkably improve the printed image quality finally obtained by using the nonionic surfactant (B) in combination. In addition, although the detailed principle is unclear, it is considered that by using the nonionic surfactant (B) and the acetylene diol-based surfactant in combination, an interaction occurs between them, and they can behave like a lump of surfactants. As a result, it is considered that the nonionic surfactant (B) prevents orientation of the unmodified acetylene diol-based surfactant (A1) to a gas-liquid interface, in a similar manner to the alkylene oxide-modified acetylene diol-based surfactant (A2), during continuous discharge. In consequence, overflow of the ink from a nozzle is suppressed, and continuous discharge performance can be further improved.

Furthermore, since the nonionic surfactant (B) present on a surface of an ink layer can reduce surface energy of the surface of the ink layer, even when another printing substrate or the like is attached to the surface, the nonionic surfactant (B) can reduce adhesion of the printing substrate, and blocking resistance is improved. In addition, as described above, in the ink of the present invention, since it is that the surfactant is present in a lump, it is considered that the surfactant does not easily bleed to the surface of the ink layer and migration can be prevented.

Note that the aqueous inkjet inks specifically disclosed in Patent Literatures 1 to 3 are different from the ink of the present invention in that they do not contain an acetylene diol-based surfactant at all. In addition, the aqueous inkjet ink specifically disclosed in Patent Literature 4 is different from the ink of the present invention in that the content of the unmodified acetylene diol-based surfactant (A1) ("component (A)" in Examples of Patent Literature 4) is significantly more than 2,000 ppm, or the unmodified acetylene diol-based surfactant (A1) is not contained at all.

Subsequently, main components constituting the ink of the present invention will be described below.

<Unmodified Acetylene Diol-Based Surfactant (A1)>

As described above, the unmodified acetylene diol-based surfactant (A1) has a low molecular weight, further has low hydrophilicity, and has a high orientation rate to a gas-liquid interface. In addition, the unmodified acetylene diol-based surfactant (A1) can reduce a surface tension of the ink immediately after the ink lands on a printing substrate, and can prevent beading.

In the embodiment of the present invention, the unmodified acetylene diol-based surfactant (A1) is contained in an amount of 5 to 2,000 ppm in the total amount of the ink. The content of the unmodified acetylene diol-based surfactant (A1) is preferably 10 to 2,000 ppm, more preferably 50 to 1,000 ppm, and particularly preferably 50 to 300 ppm. By using the unmodified acetylene diol-based surfactant (A1) within the above ranges and further using the unmodified acetylene diol-based surfactant (A1) in combination with a surfactant described later, beading is prevented and solid filling is improved. Therefore, a printed matter having favorable printed image quality can be obtained. In addition, since the amount of the unmodified acetylene diol-based surfactant (A1) is small, continuous discharge performance does not easily deteriorate, and blocking and migration in a printed matter can be also prevented.

Specific examples of the unmodified acetylene diol-based surfactant (A1) that can be used in the embodiment of the present invention include 2,4,7,9-tetramethyl-5-decine-4,7-diol, 2,5,8,11-tetramethyl-6-dodecine-5,8-diol, hexadeca-8-yne-7,10-diol, 4,7-dipropyl-deca-5-yne-4,7-diol, 6,9-dimethyl-tetradeca-7-yne-6,9-diol, 3,6-diisopropyl-2,7-dimethylocta-4-yne-3,6-diol, octadeca-9-yne-8,11-diol, 7,10-dimethylhexadeca-8-yne-7,10-diol, 5,8-dibutyldodeca-6-yne-5,8-diol, 4,7-diisobutyl-2,9-dimethyl-deca-5-yne-4,7-diol, and 5,14-diethyl-8,11-dimethyloctadeca-9-yne-8,11-diol. Among these compounds, 2,4,7,9-tetramethyl-5-decine-4,7-diol and/or 2,5,8,11-tetramethyl-6-dodecine-5,8-diol is preferably used from the viewpoint of compatibility with other materials in the ink of the present invention. Note that only one of the above compounds may be used, or two or more types thereof may be used in combination. In addition, as the above compounds, those synthesized by a conventionally known method may be used, or commercially available products may be used. Examples of the commercially available products include Surfynol 104, Surfynol DF110D, and Surfynol 82 manufactured by Evonik, and Acetylenol E00 manufactured by Kawaken Fine Chemicals Co., Ltd.

<Alkylene Oxide-Modified Acetylene Diol-Based Surfactant (A2)>

In the ink of the present invention, the alkylene oxide-modified acetylene diol-based surfactant (A2) is used together with the unmodified acetylene diol-based surfactant (A1). As described above, the alkylene oxide-modified acetylene diol-based surfactant (A2) emulsifies the unmodified acetylene diol-based surfactant (A1), and exhibits its own surface active performance, whereby a printed matter free from beading and excellent in blocking resistance and migration resistance can be manufactured, and an ink excellent in continuous discharge performance can be further obtained. The alkylene oxide-modified acetylene diol-based surfactant (A2) has an HLB value of 4 to 10, preferably 7 to 9 from this viewpoint. By the HLB value being within the above ranges, in particular, it is possible to prevent beading in a printed matter and to improve continuous discharge performance. The HLB value of the alkylene oxide-modified acetylene diol-based surfactant (A2) may be 3.5 to 10.4, 4.0 to 10.0, 4.4 to 9.5, 6.5 to 9.4, 6.5 to 9.0, or 7.0 to 9.0.

The HLB (Hydrophile-Lipophile Balance) value is one of parameters representing hydrophilicity and hydrophobicity of a material. Note that the smaller the HLB value, the higher hydrophobicity of a material, and the larger the HLB value, the higher hydrophilicity of a material. As a method for determining the HLB value, a method for actually measuring the HLB value by an experiment and a method for calculating the HLB value from a molecular structure are known, and examples of the method for calculating the HLB value from a molecular structure include a Griffin method, a Davies method, and a Kawakami method. In the embodiment of the present invention, except for a case of a silicon-based surfactant described later, a value calculated using the Griffin method is used as the HLB value.

The Griffin method is a method generally used for a nonionic material, and is determined by the following formula (2) using a molecular weight of a target material.

$$\text{HLB value} = 20 \times (\text{sum of molecular weights of hydrophilic moieties})/(\text{molecular weight of material}) \quad \text{Formula (2):}$$

On the other hand, in a case of a silicon-based surfactant described later, since the silicon-based surfactant is generally a mixture containing many compounds, a value actually measured by a method described on page 324 of "Handbook of Surfactants" (edited by Iichiro Nishi et al., Sangyo Tosho, 1960) is used as the HLB value.

As a specific actual measurement method, 0.5 g of a target material is dissolved in 5 mL of ethanol, and then titration is performed in an environment of 25° C. using a 2% by mass phenol aqueous solution while the solution is stirred. Then, a point at which the above solution becomes turbid is defined as an end point, and the HLB value is calculated by the following formula (3) using the amount (A (mL)) of the phenol aqueous solution added dropwise until the solution reaches the end point.

$$\text{HLB value} = 0.89 \times A + 1.11 \quad \text{Formula (3):}$$

The addition amount of the alkylene oxide-modified acetylene diol-based surfactant (A2) having an HLB value of 4 to 10 is 0.2 to 5% by mass with respect to the total amount of the ink. The addition amount is preferably 0.5 to 3% by mass, and more preferably 0.8 to 2.5% by mass from the viewpoint of improving continuous discharge performance and preventing beading and blocking in a printed matter. In addition, a ratio of the content of the alkylene oxide-modified acetylene diol-based surfactant (A2) to the content of the unmodified acetylene diol-based surfactant (A1) is 10 to 5,000, preferably 30 to 500, and more preferably 50 to 300 from the viewpoint of forming a preferable emulsified state with the unmodified acetylene diol-based surfactant (A1) and assisting a function of the unmodified acetylene diol-based surfactant (A1) to improve continuous discharge performance and to further prevent beading, blocking, and migration in a printed matter.

Specific examples of the alkylene oxide-modified acetylene diol-based surfactant (A2) include a compound represented by the following general formula (4).

General Formula (4):

[Chemical Formula 1]

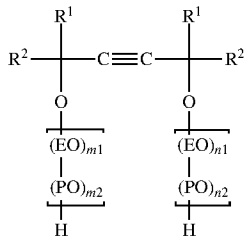

In general formula (4), $R^1$ and $R^2$ each represent an alkyl group having 1 to 5 carbon atoms and optionally having a branch, EO represents an ethylene oxide group, and PO represents a propylene oxide group. In addition, m1, m2, n1, and n2 each represent an integer of 0 to 30, and m1+n1+m2+n2 is an integer of 1 to 120. Note that an addition mode of the ethylene oxide group and the propylene oxide group in [ ] may be block addition or random addition.

The alkylene oxide-modified acetylene diol-based surfactant (A2) having a structure represented by the general formula (4) has a molecular weight of preferably 300 to 1,200, more preferably 350 to 900, still more preferably 400 to 700. The acetylene diol-based surfactant (A2) having a molecular weight within the above ranges has a high orientation rate to a gas-liquid interface in a similar manner to the unmodified acetylene diol-based surfactant (A1), therefore can easily prevent beading, and can further prevent blocking and the like. Note that the molecular weight of the alkylene oxide-modified acetylene diol-based surfactant (A2) refers to a formula weight, and can be determined by calculation.

As the alkylene oxide-modified acetylene diol-based surfactant represented by the general formula (4), one synthesized by a conventionally known method may be used, or a commercially available product may be used. Examples of the commercially available product of the compound represented by general formula (4) include: Surfynol 420, Surfynol 440, Surfynol 465, Surfynol 485, Surfynol 2502, and Dynol 604 and 607 manufactured by Evonik; OLFINE series manufactured by Nissin Chemical Industry Co., Ltd.; and Acetylenol E13T, E40, E60, E100, and E200 manufactured by Kawaken Fine Chemicals Co., Ltd.

<Nonionic Surfactant (B)>

As described above, in the embodiment of the present invention, in addition to the acetylene diol-based surfactant (A), the nonionic surfactant (B) other than the acetylene diol-based surfactant can be used in combination. By using the nonionic surfactant (B), an interaction occurs with the acetylene diol-based surfactant (A), and the nonionic surfactant (B) and the acetylene diol-based surfactant (A) behave like a lump of surfactants, whereby it is possible to further improve continuous discharge performance and to prevent blocking and migration in a printed matter. In addition, since the nonionic surfactant (B) gradually moves to a gas-liquid interface as compared with the acetylene diol-based surfactant (A) and is oriented, thus wet-spreading of an ink droplet after several tens of milliseconds elapse from a time when the ink droplet lands on a printing substrate can be promoted, and the ink droplet can be uniformly wet and spread to improve printed image quality of a printed matter.

The nonionic surfactant (B) has an HLB value of preferably 6 to 14, more preferably 8 to 11. It is considered that when the HLB value is within the above ranges, a strong interaction with the alkylene oxide-modified acetylene diol-based surfactant (A2) occurs, and a preferable emulsified state is formed, whereby continuous discharge performance is improved, and a printed matter in which blocking and migration do not occur is obtained. The HLB value of the nonionic surfactant (B) may be 5.5 to 14.4, 6.0 to 14.0, 6.4 to 13.5, 7.5 to 11.4, or 8.0 to 11.0.

Furthermore, since the interaction between the acetylene diol-based surfactant (A) and the nonionic surfactant (B) can be further strengthened and a preferable emulsified state can be created, a mass factor-added HLB value calculated by the following formula (1) is preferably 0.3 to 2.0, more preferably 0.5 to 1.5, and still more preferably 0.8 to 1.3 from the viewpoint that continuous discharge performance and blocking resistance are favorable. The HLB value is a value determined by a structure of a surfactant molecules and the like, and evaluates an influence of the entire surfactant present in the ink. Therefore, in the following formula (1), the HLB value is multiplied by the amount of the surfactant, that is, the amount of the surfactant molecules, and then the sum is calculated for comparison.

Formula (1):

[Mathematical Formula 1]

$$[\text{Mass factor} - \text{added } HLB \text{ value}] = \frac{\sum_{i=1}^{l}(HLB_i \times WT_i) + \sum_{j=1}^{m}(HLB_j \times WT_j)}{\sum_{k=1}^{n}(HLB_k \times WT_k)}$$

(wherein i represents the type of surfactant used as the unmodified acetylene diol-based surfactant (A1), and l represents the number of types of surfactants used as the unmodified acetylene diol-based surfactant (A1). j represents the type of surfactant used as the alkylene oxide-modified acetylene diol-based surfactant (A2), and m represents the number of types of surfactants used as the alkylene oxide-modified acetylene diol-based surfactant (A2). k represents the type of surfactant used as the nonionic surfactant (B), and n represents the number of types of surfactants used as the nonionic surfactant (B). $HLB_i$ represents an HLB value of the surfactant i, $WT_i$ represents the content (% by mass) of the surfactant i with respect to the total mass of the aqueous inkjet ink, $HLB_j$ represents an HLB value of the surfactant j, $WT_j$ represents the content (% by mass) of the surfactant j with respect to the total mass of the aqueous inkjet ink, $HLB_k$ represents an HLB value of the surfactant k, and $WT_k$ represents the content (% by mass) of the surfactant k with respect to the total mass of the aqueous inkjet ink.)

The content of the nonionic surfactant (B) in the embodiment of the present invention is preferably 0.3 to 3% by mass, and more preferably 0.5 to 2% by mass in the total amount of the ink. Furthermore, a ratio of the content of the nonionic surfactant (B) to the total amount of the content of the unmodified acetylene diol-based surfactant (A1) and the content of the alkylene oxide-modified acetylene diol-based surfactant (A2) (value represented by "content of nonionic surfactant (B)/{content of acetylene diol-based surfactant (A1)+content of acetylene diol-based surfactant (A2)}") is preferably 0.3 to 2.0, and more preferably 0.5 to 1.5. By the content of the nonionic surfactant (B) and the ratio of the content being within the above ranges, the surfactants easily form an emulsified state and easily function as a lump of surfactants. Therefore, continuous discharge performance is favorable, and a printed matter in which blocking and migration do not occur is obtained.

As the nonionic surfactant (B) in the embodiment of the present invention, one synthesized by a conventionally known method may be used, or a commercially available product may be used. In addition, examples of the type of the nonionic surfactant (B) include an acetylene monool-based surfactant, a silicon-based surfactant, a fluorine-based surfactant, a polyoxyalkylene alkyl ether-based surfactant, a polyoxyalkylene aryl ether-based surfactant, and a polyalkylene glycol alkylate-based surfactant. Only one of these compounds may be used, or two or more types thereof may be used in combination.

In particular, in the embodiment of the present invention, it is particularly preferable to contain a silicon-based surfactant as the nonionic surfactant (B) from the viewpoint of easily interacting with the acetylene diol-based surfactant (A) and the viewpoint of easily reducing blocking due to reduction in surface energy of an ink layer.

The silicon-based surfactant preferably used in the embodiment of the present invention is a compound represented by the following general formula (5).

General Formula (5):

[Chemical Formula 2]

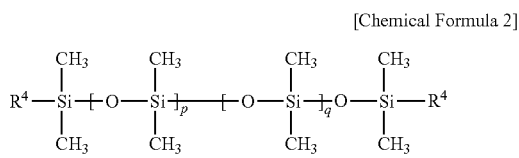

In general formula (5), p is an integer of 0 or more, and q is an integer of 1 or more. $R^3$ is a methyl group or a structure represented by the following general formula (6), and $R^4$ is an alkyl group having 1 to 6 carbon atoms or a structure represented by the following general formula (6). Note that, when $R^3$ is a methyl group, p is 0.

General Formula (6):

[Chemical Formula 3]

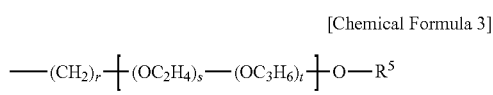

In general formula (6), r is an integer of 1 to 6, s is an integer of 0 to 50, and t is an integer of 0 to 50. Note that s+t is 1 or more. R is a hydrogen atom, an alkyl group having 1 to 6 carbon atoms, or a (meth)acrylic group. Note that an addition mode of the ethylene oxide group and the propylene oxide group in [ ] may be block addition or random addition.

As the silicon-based surfactant in the embodiment of the present invention, one synthesized by a conventionally known method may be used, or a commercially available product may be used. Examples of the commercially available product include: SF8428, FZ-2162, 8032ADDITIVE, SH3749, FZ-77, L-7001, L-7002, FZ-2104, FZ-2110, F-2123, SH8400, and SH3773M manufactured by Dow Corning Toray Co., Ltd.; BYK-345, BYK-346, BYK-347, BYK-348, BYK-349, and BYK-3420 manufactured by BYK-Chemie GmbH; TEGO Wet250, TEGO Wet260, TEGO Wet270, TEGO Wet280, TEGO Glide100, TEGO Glide410, TEGO Glide432, TEGO Glide435, TEGO Glide440, TEGO Glide450, TEGO Twin 4000, TEGO Twin 4100, and TEGO Twin 4200 manufactured by Evonik; KF-351A, KF-352A, KF-353, KF-354L, KF-355A, KF-615A, KF-640, KF-642, and KF-643 manufactured by Shin-Etsu Chemical Co., Ltd.; and SILFACE SAG series manufactured by Nissin Chemical Industry Co., Ltd. Only one of these commercially available products may be used, or two or more types thereof may be used in combination.

In order to behave like a lump of surfactants with the acetylene diol-based surfactant (A), the silicon-based surfactant preferably causes an interaction with the acetylene diol-based surfactant (A). On the other hand, the silicon-based surfactant is preferably compatible with the acetylene diol-based surfactant (A) to some extent from the viewpoint of further improving continuous discharge performance and improving solid filling in a printed matter. It is preferable to use two or more types of silicon-based surfactants in combination as the nonionic surfactant (B) from the above viewpoints. In addition, as the two or more types of silicon-based surfactants, silicon-based surfactants having HLB values actually measured by the above-described method, in which a difference between the HLB values is two or more, are particularly preferably used in combination.

In addition, in the embodiment of the present invention, a polyoxyalkylene alkyl ether-based surfactant can also be used as the nonionic surfactant (B). The polyoxyalkylene alkyl ether-based surfactant has favorable compatibility with water and an acetylene diol-based surfactant, and can improve printed image quality such as preventing beading without affecting these materials.

As the polyoxyalkylene alkyl ether-based surfactant, for example, a compound in which the number of added moles of ethylene oxide groups and/or propylene oxide groups is 5 to 100 and the number of carbon atoms in a terminal hydrocarbon group is 6 to 22 can be used. Note that the terminal hydrocarbon group may be, for example, a chain alkyl group (which may have a branched structure), a chain alkenyl group (which may have a branched structure), an alicyclic alkyl group (to which one or more alkyl groups may be added), or an aromatic group (to which one or more alkyl groups may be added). In addition, examples of a commercially available product of the polyoxyalkylene alkyl ether-based surfactant include EMULGEN series such as EMULGEN 104P, 105, 106, 108, 109P, 120, 123P, 150, 210, 220, 306P, 320P, and 350 (manufactured by Kao Corporation), BLAUNON series such as BLAUNON EL-1502.2, 1505, 1507, 1509, 1515, 1521, 1530, 1540P, CH-302L, 305, 310L, 315L, 320L, 325L, 330L, 340, SR-702L, 705, 707, 711, 715, 720, 730, 750F, BE-5, 10, 20, 30, and BN-3 (manufactured by AOKI OIL INDUSTRIAL CO., LTD.), NONION series such as NONION K-204, 220, 230, 2100W, P-208, 210, 213, E-202, 205, 212, 215, 230, 5-202, 207, 215, 220, EH-204, 208, ID-203, 206, and 209 (manufactured by NOF CORPORATION), Lutensol series such as Lutensol XL40, 50, 60, 70, 80, 90, XP30, 40, 50, 60, 70, 80, 90, and 100 (manufactured by BASF), and Newcol series such as Newcol 2302, 2303, 2305, 2308, 2310, 2320, and 2360 (manufactured by Nippon Nyukazai Co., Ltd.). Only one of the products listed above may be used, or two or more types thereof may be used in combination. Furthermore, as the polyoxyalkylene alkyl ether-based surfactant, one synthesized by a conventionally known synthesis method may be used.

<Water-Soluble Organic Solvent>

In the embodiment of the present invention, a water-soluble organic solvent is used for improving continuous discharge performance by ensuring a moisture retaining property on an inkjet head, preventing beading by improving compatibility of the above-described surfactants, and the like. In the present application, the "water-soluble organic solvent" refers to a solvent that has a solubility of 1% by mass or more in water at 25° C. and is liquid at 25° C.

As the water-soluble organic solvent in the embodiment of the present invention, monohydric alcohols having 1 to 6 carbon atoms, such as ethanol, propanol, isopropanol, butanol, isobutanol, tert-butanol, isopentanol, and dimethylbutanol;

alkanediols having 3 to 6 carbon atoms, such as 1,2-propanediol, 1,3-propanediol, 1,2-butanediol, 1,3-butanediol, 1,4-butanediol, 2,3-butanediol, 1,2-pentanediol, 1,5-pentanediol, and 1,2-hexanediol;

polyalkylene glycols, such as diethylene glycol, triethylene glycol, tetraethylene glycol, dipropylene glycol, and tripropylene glycol;

alkylene glycol ethers represented by the following general formula (7);

methoxybutanols, such as 3-methoxy-1-butanol and 3-methoxy-3-methylbutanol;

a nitrogen-containing solvent, such as 2-pyrrolidone, N-methylpyrrolidone, 3-methoxy-N,N-dimethylpropanamide, and 3-butoxy-N,N-dimethylpropanamide;

a lactone-based solvent, such as γ-butyrolactone and ε-caprolactone; and the like can be used. Only one of the above water-soluble organic solvents may be used, or two or more types thereof may be used in combination.

$$R^6\text{—O-(AO)}_u\text{—H} \quad \text{General Formula (7):}$$

In the general formula (7), $R^6$ represents an alkyl group having 1 to 4 carbon atoms and optionally having a branch, AO represents an ethylene oxide group and/or a propylene oxide group, and u represents an integer of 1 to 3.

<<1,2-Propanediol>>

In the embodiment of the present invention, it is preferable to use 1,2-propanediol among the water-soluble organic solvents described above. 1,2-Propanediol has a large proportion of hydroxyl groups to its molecular weight, therefore has particularly high hydrophilicity, and can be uniformly present in the aqueous inkjet ink. On the other hand, 1,2-propanediol does not have excessive affinity with the acetylene diol-based surfactant (A) and the nonionic surfactant (B), and therefore does not inhibit orientation of these surfactants. As a result, it is considered that 1,2-propanediol can prevent beading. In addition, 1,2-propanediol has a boiling point of 188° C. that is moderately low, and it therefore not only suppresses drying of the ink on a nozzle to improve continuous discharge performance, but also it rapidly volatilizes after printing. Therefore, an ink excellent in drying property and blocking resistance is obtained. In addition, 1,2-propanediol has a property of not easily destroying the dispersion state of a pigment described later, and can be preferably used from the viewpoint of being able to prevent deterioration of storage stability of the ink, which, as a result, leads to further improvement in continuous discharge performance.

When 1,2-propanediol is used as the water-soluble organic solvent, the content thereof is preferably 5 to 30% by mass, and more preferably 10 to 25% by mass in the total amount of the ink. By setting the content of 1,2-propanediol to 5% by mass or more, the effect of the surfactant can be sufficiently exhibited, and therefore beading can be easily prevented. In addition, the drying property on a non-absorbent substrate is preferable, and a printed matter excellent in blocking resistance can be obtained. On the other hand, by setting the content to 30% by mass or less, continuous discharge performance is improved.

Note that 1,2-propanediol may be used together with a water-soluble organic solvent listed above other than 1,2-propanediol.

<<Specific Alkylene Glycol Ethers>>

In the embodiment of the present invention, among the compounds represented by the general formula (7), it is also preferable to use one or more alkylene glycol ethers (also referred to as "specific alkylene glycol ethers" in the present specification) selected from the group consisting of ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, propylene glycol monobutyl ether, dipropylene glycol monomethyl ether, and dipropylene glycol monopropyl ether from the viewpoint of obtaining an ink particularly excellent in drying property and from the viewpoint of obtaining a printed matter excellent in blocking resistance by functioning as a film forming aid for a surfactant.

When the specific alkylene glycol ethers are used, the content thereof is preferably 1 to 15% by mass, and more preferably 3 to 10% by mass in the total amount of the inkjet ink from the viewpoint of achieving both improvement in drying property on a non-absorbent substrate and improvement in continuous discharge performance by preventing sticking of the ink to a nozzle interface. Note that the specific alkylene glycol ethers may be used singly or in combination of two or more types thereof. In addition, the specific alkylene glycol ethers may also be used together with 1,2-propanediol and/or a water-soluble organic solvent other than 1,2-propanediol and the specific alkylene glycol ethers listed above.

In the embodiment of the present invention, the amount of a water-soluble organic solvent having a boiling point of 235° C. or higher contained in the ink is preferably 0 to 5% by mass, and more preferably 0 to 2% by mass, from the viewpoint of obtaining a printed matter that has an excellent drying property even on a non-absorbent substrate and does not cause beading and blocking, and further from the viewpoint of obtaining an ink having excellent continuous discharge performance.

Note that the "boiling point" in the present specification is a value at 1 atm, and can be measured using, for example, a thermal analyzer. A phrase "the content (amount) is 0% by mass" means that no target compound is contained.

The total content of the water-soluble organic solvent contained in the ink of the present invention is preferably 5 to 40% by mass with respect to the total amount of the ink. In particular, the total amount is more preferably 10 to 35% by mass from the viewpoint that a sufficient drying property can be ensured even on a non-absorbent substrate.

<Binder Resin>

In the embodiment of the present invention, a binder resin is used from the viewpoint that abrasion resistance, blocking resistance, migration resistance, and the like of a printed matter can be remarkably improved.

In general, as the binder resin used in an aqueous inkjet ink, a water-soluble resin, and a hydrosol and an emulsion, each of which is a type of water-insoluble resin, are known. Here, the "water-soluble resin" refers to a 1% by mass water mixed solution of a target pigment dispersing resin that is transparent when viewed with the naked eye under a condition of 25° C. In addition, the "hydrosol" refers to a form, among "water-insoluble resins" (resins that are not a water-soluble resin), in which an acidic and/or basic functional group is present in the resin structure, and the resin is dispersed in a dispersion medium without using an emulsifier, such as a surfactant or a polymer. On the other hand, the "emulsion" refers to a form in which the resin is forcibly dispersed in a dispersion medium by making the emulsifier adsorbing and/or bonding to the resin surface. Note that, in the present specification, the above-mentioned hydrosol and the emulsion are also collectively referred to as "fine resin particles".

<<Water-Soluble Resin>>

In an embodiment, that is, in an embodiment of the present invention, it is preferable to use a water-soluble resin and/or a hydrosol as the binder resin. These resins have affinity for an aqueous medium (a medium formed of a liquid containing at least water) without using an emulsifier, and at least a part of these resins swells and/or dissolves in the aqueous medium. Therefore, clogging due to precipitation of the resins and the like does not easily occur in the vicinity of a nozzle of an inkjet head, and excellent continuous discharge performance can be obtained. In addition, these resins can function as compatibilizers for the unmodified acetylene diol-based surfactant (A1). Therefore, the unmodified acetylene diol-based surfactant (A1) is uniformly oriented at a gas-liquid interface, and occurrence of beading in a printed matter can also be prevented.

Examples of a type of resin that can be used as the water-soluble resin and the hydrosol include an acrylic-based resin, a urethane-based resin, and a polyester-based resin. Among these resins, an acrylic-based resin is preferably used in consideration of storage stability and continuous discharge performance of the ink and abrasion resistance of a printed matter.

Note that the "acrylic-based resin" in the present specification represents a resin using one or more selected from the group consisting of acrylic acid, methacrylic acid, an acrylic ester, and a methacrylic ester as a polymerizable monomer (a styrene-based monomer may be further used).

In addition, in the embodiment of the present invention, as the water-soluble resin, a resin synthesized by a conventionally known method may be used, or a commercially available product may be used. A composition thereof is not particularly limited, and for example, any resin having a random structure, a block structure, a comb structure, a star structure, or the like can be used.

When a water-soluble resin is used as the binder resin, the water-soluble resin has a weight average molecular weight that is preferably within a range of 5,000 or more and 50,000 or less, more preferably within a range of 10,000 or more and 40,000 or less. By setting the weight average molecular weight to 5,000 or more, abrasion resistance of a printed matter is improved, and beading is easily prevented. In addition, by setting the weight average molecular weight to 50,000 or less, continuous discharge performance from an inkjet head is favorable.

Note that the weight average molecular weight of the resin can be measured by a conventional method. In the embodiment of the present invention, the weight average molecular weight is a weight average molecular weight in terms of standard polystyrene by gel permeation chromatography (GPC). For example, the weight average molecular weight is a value measured as a weight average molecular weight in terms of polystyrene measured using a GPC (HLC-8120GPC manufactured by Tosoh Corporation) equipped with a TSK gel column (manufactured by Tosoh Corporation) and an RI detector, and using THF as an eluent.

When a water-soluble resin is selected, an acid value is also important. When a water-soluble resin is used as the binder resin, an acid value thereof is preferably 5 to 80 mgKOH/g, and more preferably 15 to 50 mgKOH/g. By setting the acid value to 5 mgKOH/g or more, even if the resin is solidified in the vicinity of a nozzle of an inkjet head, the resin can be dissolved in the ink again. Therefore, clogging of the nozzle is easily prevented, and continuous discharge performance is improved. In addition, when the acid value is 80 mgKOH/g or less, a printed matter excellent in water resistance and abrasion resistance is obtained, and the water-soluble resin easily functions as a compatibilizer of the unmodified acetylene diol-based surfactant (A1). Therefore, a printed matter without beading is easily obtained.

The "acid value of the resin" is the number of mg of potassium hydroxide (KOH) required to neutralize acid groups contained in 1 g of the resin. In the present specification, a value calculated by the following method is used as the acid value. For example, when the resin contains a polymerizable monomer which has na acid groups with a valency of va in one molecule and having a molecular weight of Ma in an amount of Wa % by mass in polymerizable monomers constituting the resin, an acid value (mgKOH/g) of the resin is determined by the following formula (8).

(Acid value)={($va \times na \times Wa$)/($100 \times Ma$)}×56.11×1000    Formula (8):

In the above formula (8), the numerical value "56.11" is the molecular weight of potassium hydroxide.

The content of the water-soluble resin is preferably 0.5 to 10% by mass, more preferably 1 to 8% by mass, and still more preferably 2 to 6% by mass, with respect to the total amount of the ink. When the content of the water-soluble resin is 0.5% by mass or more, the unmodified acetylene diol-based surfactant (A1) can be sufficiently compatibilized, thus storage stability of the ink is improved, and beading in a printed matter can also be prevented. When the content is 10% by mass or less, the viscosity of the ink can be suppressed within a preferable range, and an ink excellent in continuous discharge performance can be obtained.

<<Fine Resin Particles>>

On the other hand, in general, fine resin particles, such as a hydrosol or an emulsion, have a higher molecular weight than the water-soluble resin. In addition, when the same amount of resin is blended, the fine resin particles can lower the viscosity of the ink as compared with a case of the water-soluble resin. Therefore, by using the fine resin particles, a larger amount of resin can be contained in the ink, and it is easy to enhance abrasion resistance, blocking resistance, and migration resistance of a printed matter.

Among resins used as the fine resin particles, examples of the type of resin that can be used as an emulsion include an acrylic-based resin, a urethane-based resin, a polyester-based resin, a styrene-butadiene-based resin, an acrylonitrile-butadiene-based resin, a vinyl chloride-based resin, and a polyolefin-based resin. Among these resins, an emulsion of one or more resins selected from the group consisting of an acrylic-based resin, a urethane-based resin, a polyester-based resin, and a polyolefin-based resin can be preferably used in consideration of easily maintaining storage stability of the ink and easily improving abrasion resistance and blocking resistance of a printed matter.

In addition, also when a hydrosol is used as the fine resin particles, it is preferable to use one or more resins selected from the group consisting of an acrylic-based resin, a urethane-based resin, and a polyester-based resin from the viewpoint of improving abrasion resistance and blocking resistance of a printed matter. In addition, it is particularly preferable to use an acrylic-based resin further from the viewpoint of improving the continuous discharge performance described above.

Note that, when fine resin particles are used as the binder resin in the ink, particularly when an emulsion is used, it is necessary to consider the minimum filming temperature (MFT) of the fine resin particles. When fine resin particles having a low MFT are used, the MFT of the fine resin particles is further lowered depending on the water-soluble organic solvent added to the ink, and the fine resin particles may be stuck to the vicinity of a nozzle of an inkjet head and clogging may occur even at room temperature. In particular, in the case of an emulsion, once a film is formed, it is difficult to re-dissolve the stuck emulsion into the ink. Therefore, continuous discharge performance may be impaired by the stuck emulsion. In order to avoid such a problem, it is preferable to set the MFT of the emulsion to 60° C. or higher by adjusting the type and amount of the polymerizable monomers constituting the emulsion.

When a hydrosol is used as the fine resin particles, continuous discharge performance is less likely to deteriorate than that in a case of an emulsion. On the other hand, by using a hydrosol having an MFT of 60° C. or higher, it is possible to reduce factors that may deteriorate continuous discharge performance. Therefore, it is also preferable to set the MFT to 60° C. or higher in the case with a hydrosol.

Note that the MFT can be measured by, for example, an MFT tester manufactured by TESTER SANGYO CO., LTD.

When an emulsion is used, the content thereof is preferably 2 to 15% by mass, and more preferably 4 to 8% by mass, with respect to the total amount of the ink. When the content of the emulsion is 2% by mass or more, abrasion resistance and blocking resistance are improved, and when the content is 15% by mass or less, the viscosity of the ink can be suppressed within a preferable range, and the ink is excellent in continuous discharge performance.

<Pigment>

As the pigment, an inorganic pigment and/or an organic pigment can be used. In addition, these pigments may be used singly or in combination of two or more types thereof. The content of the pigment is preferably 0.1 to 20% by mass, more preferably 1 to 10% by mass, and still more preferably 2 to 7% by mass, with respect to the total mass of the ink.

When an inorganic pigment is used as the pigment, specific examples thereof include titanium oxide, zinc white, zinc sulfide, white lead, calcium carbonate, precipitated barium sulfate, white carbon, alumina white, kaolin clay, talc, bentonite, carbon black, black iron oxide, cadmium red, red iron oxide, molybdenum red, molybdate orange, chrome vermilion, chrome yellow, cadmium yellow, yellow iron oxide, titanium yellow, chromium oxide, viridian, titanium cobalt green, cobalt green, cobalt chromium green, victoria green, ultramarine blue, Prussian blue, cobalt blue, cerulean blue, cobalt silica blue, cobalt zinc silica blue, manganese violet, and cobalt violet.

Carbon black manufactured by a furnace method or a channel method can be used as the carbon black listed above. In particular, carbon black manufactured by a furnace method or a channel method and having characteristics such as a primary particle size of 11 to 40 nm, a specific surface area by a BET method of 50 to 400 $m^2/g$, a volatile content of 0.5 to 10%, and a pH of 2 to 10 is preferable. Examples of commercially available products having such specifications include No. 33, 40, 45, 52, 900, 2200B, 2300, MA7, MA8, and MCF88 (manufactured by Mitsubishi Chemical Corporation), RAVEN1255 (manufactured by BILLAR-CARBON), REGAL330R, 400R, 660R, MOGUL L, and ELFTEX415 (manufactured by Cabot Corporation), and NIPex90, NIPex150T, NIPex160IQ, NIPex170IQ, NIPex75, PrinteX35, PrinteX85, PrinteX90, PrinteX95, and PrinteXU (manufactured by Orion Engineered Carbons), all of which can be preferably used.

On the other hand, examples of an organic pigment include an azo pigment, a phthalocyanine pigment, an anthraquinone pigment, a quinacridone pigment, an isoindolinone pigment, a quinophthalone pigment, a dye lake pigment, and a fluorescent pigment.

Specifically, when examples are given with a color index, examples of the organic pigment include C.I. Pigment Blue 1, 2, 3, 15:1, 15:3, 15:4, 15:6, 16, 21, 22, 60, and 64 as cyan pigments.

Examples of the organic pigment include C.I. Pigment Red 5, 7, 9, 12, 31, 48, 49, 52, 53, 57, 97, 112, 120, 122, 146, 147, 149, 150, 168, 170, 176, 177, 178, 179, 184, 185, 188, 202, 206, 207, 209, 238, 242, 254, 255, 264, 269, and 282, and C.I. Pigment Violet 19, 23, 29, 30, 32, 36, 37, 38, 40, and 50 as magenta pigments.

Examples of the organic pigment include C.I. Pigment Yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185, and 213 as yellow pigments.

Examples of the organic pigment include aniline black (C.I. Pigment Black 1), perylene black (C.I. Pigment Black 31 and 32), and azomethine azoblack as black pigments. In addition, a plurality of chromatic color pigments such as the cyan pigment, the magenta pigment, the yellow pigment, and the following brown pigment and orange pigment may be mixed to obtain a black pigment.

Examples of pigments other than the above pigments include C.I. Pigment Green 7, 10, and 36, C.I. Pigment Brown 3, 5, 25, and 26, and C.I. Pigment Orange 2, 5, 7, 13, 14, 15, 16, 24, 34, 36, 38, 40, 43, 62, 63, 64, and 71.

<Pigment Dispersing Resin>

In order to maintain storage stability and continuous discharge performance of the ink for a long period of time, the above pigments are preferably used while being dispersed in the ink. Examples of a method for stably dispersing and retaining the pigment in the ink include (1) a method for coating at least a part of a surface of the pigment with a pigment dispersing resin, (2) a method for making a water-soluble and/or water-dispersible surfactant adsorbed on a surface of the pigment, and (3) a method for chemically and/or physically introducing a hydrophilic functional group onto a surface of the pigment and dispersing the hydrophilic functional group in the ink without any pigment dispersing resin or surfactant (self-dispersible pigment).

For the ink of the present invention, the method of (1), that is, the method using a pigment dispersing resin is preferably selected among the above methods. This is because pigment coating ability and charges of the pigment dispersing resin can be easily adjusted by selecting and examining the composition, weight average molecular weight, and the like of a polymerizable monomer constituting the resin, therefore, storage stability can be stably imparted even to a fine pigment, and furthermore, a printed matter excellent in continuous discharge performance, color developability, and color reproducibility can be obtained.

Examples of the pigment dispersing resin include an acrylic-based resin, a styrene-(anhydrous) maleic acid-based resin, an α-olefin-(anhydrous) maleic acid-based resin, a urethane-based resin, and a polyester-based resin. Among these resins, it is preferable to use one or more resins selected from an acrylic-based resin, a styrene-(anhydrous) maleic acid-based resin, and an α-olefin-(anhydrous) maleic acid-based resin from the viewpoint of strong adsorption with the pigment and improvement in storage stability and continuous discharge performance. Note that, in the present specification, "(anhydrous) maleic acid" represents maleic acid and/or maleic anhydride.

When a water-soluble resin is used as the pigment dispersing resin, an acid value thereof is preferably 60 to 400 mgKOH/g. By setting the acid value within the above range, dispersion stability of the pigment, and storage stability and continuous discharge performance of the ink can be made preferable. In addition, the acid value is more preferably 100 to 350 mgKOH/g, and still more preferably 120 to 300 mgKOH/g. On the other hand, when a water-insoluble resin is used as the pigment dispersing resin, an acid value thereof is preferably 0 to 100 mgKOH/g, more preferably 5 to 90 mgKOH/g, and still more preferably 10 to 80 mgKOH/g. When the acid value is within the above range, a printed matter excellent in drying property and blocking resistance is obtained, and dispersion stability of the pigment and continuous discharge performance of the ink are also improved. Note that the acid value of the pigment dispersing resin can be measured in a similar manner to the case of the binder resin described above.

The pigment dispersing resin preferably has a weight average molecular weight of 5,000 to 100,000. By setting the weight average molecular weight to 5,000 or more, dispersion stability of the pigment and storage stability of the ink can be made preferable. In addition, by setting the weight average molecular weight to 100,000 or less, continuous discharge performance can be made favorable. The weight average molecular weight is more preferably within a range of 10,000 to 50,000, and still more preferably within a range of 15,000 to 30,000. Note that the weight average molecular weight of the pigment dispersing resin can be measured in a similar manner to the case of the binder resin described above.

The amount of the pigment dispersing resin with respect to the amount of the pigment is preferably 1 to 120% by mass. By setting a ratio of the pigment dispersing resin to 1% by mass or more with respect to the amount of the pigment, the viscosity of the ink can be suppressed within a range in which the ink can be preferably used in inkjet printing applications, and continuous discharge performance is improved. In addition, by setting the ratio to 120% by mass or less, dispersion stability of the pigment and storage stability of the ink can be made favorable. The amount of the pigment dispersing resin with respect to the amount of the pigment is more preferably 2 to 100% by mass, and still more preferably 5 to 50% by mass.

<Water>

As water contained in the ink of the present invention, ion-exchanged water (deionized water) is preferably used instead of general water containing various ions.

The amount of water contained in the ink of the present invention is preferably within a range of 20 to 90% by mass with respect to the total amount of the ink.

<Other Components>

In the ink of the present invention, in addition to the above components, additives, such as a pH adjuster, an ultraviolet absorber, and a preservative, can be appropriately used in order to impart a desired physical property value as necessary. The addition amount of these additives is preferably 0.01% by mass or more and 10% by mass or less with respect to the total mass of the ink.

<Method for Manufacturing Ink>

Examples of a method for manufacturing the ink of the present invention containing the above-described components include the following methods. Note that the method for manufacturing the ink of the present invention is not limited to the following.

First, a water-based pigment dispersing resin solution in which a pigment dispersing resin and water are mixed is manufactured. Subsequently, a pigment and, if necessary, a water-soluble organic solvent or the like are added to the water-based pigment dispersing resin solution. The mixture is mixed and stirred (pre-mixed), then subjected to a dispersion treatment using a dispersing means described later, and furthermore, if necessary, subjected to a centrifugal separation treatment or the like to remove coarse particles, thereby obtaining a pigment dispersion. Thereafter, the unmodified acetylene diol-based surfactant (A1), the alkylene oxide-modified acetylene diol-based surfactant (A2), a binder resin, a water-soluble organic solvent, water, and if necessary, the nonionic surfactant (B), other components, and the like are added to the pigment dispersion, and the mixture is well mixed and stirred. Then, the obtained mixture is filtered to remove coarse particles, whereby the ink of the present invention can be obtained.

Note that, in the present specification, the "water-based solution" refers to a solution containing an aqueous solvent and a component dispersed and/or dissolved in the aqueous solvent.

As described in the method for manufacturing the ink, it is effective to perform the pre-mixing treatment before performing the dispersion treatment. By the pre-mixing treatment, wet-spreading ability of a surface of the pigment is improved, and adsorption of the pigment dispersing resin to the surface of the pigment is promoted. Therefore, the pre-mixing treatment can be preferably performed.

In addition, a dispersing apparatus that can be used for the pigment dispersion treatment may be any dispersing apparatus generally used, and examples thereof include a ball mill, a roll mill, a sand mill, a bead mill, and a nanomizer, and a bead mill is preferably used among these dispersing apparatuses. Examples of the bead mill include a super mill, a sand grinder, an agitator mill, a grain mill, a dyno mill, a pearl mill, and a coball mill (all of which are trade names).

Since the ink of the present invention is for inkjet printing, it is preferable to use a pigment having an optimum particle size distribution from the viewpoint of preventing clogging in a nozzle or the like. Examples of methods for obtaining a pigment having a desired particle size distribution include a method for reducing the size of the pulverizing medium used in the dispersing apparatus described above, a method for increasing the filling ratio of the pulverizing medium, a method for lengthening the dispersion treatment time, a method for performing classification with a filter, a centrifuge, or the like after the dispersion treatment, and a combination of these methods. Note that a particle size distribution of the ink can be measured using, for example, Nanotrac UPA-EX150 manufactured by MicrotracBEL Corp.

<Ink Set>

The ink of the present invention may be used in a single color, but can also be used as an ink set in which a plurality of colors are combined according to an application. The combination is not particularly limited, but a full-color image can be obtained by using three colors of cyan, yellow, and magenta. In addition, by adding a black ink, blackness can be improved, and visibility of texts and the like can be improved. Furthermore, by adding a color, such as orange or green, color reproducibility can be also improved. When printing is performed on a printing substrate other than a white printing substrate, a clear image can be obtained by using a white ink in combination. In addition, an ink set including, as a constituent, an ink (clear ink) excluding a pigment from the ink of the present invention and substantially containing no colorant component, may be used.

<Ink-Pretreatment Liquid Set>

The aqueous inkjet ink of the present invention can also be used in a form of an ink-pretreatment liquid set in combination with a pretreatment liquid containing an aggregating agent. By applying the pretreatment liquid containing the aggregating agent onto a printing substrate, a layer (ink aggregation layer) that intentionally aggregates a solid component contained in the ink can be formed. Then, by causing the ink of the present invention to land on the ink aggregation layer, bleeding between ink droplets and density unevenness can be prevented, and printed image quality of a printed matter can be significantly improved. Furthermore, adhesion and blocking resistance of a printed matter can also be improved depending on a material used for the pretreatment liquid.

The "aggregating agent" in the present specification means a component that can destroy a dispersion state of a pigment contained in an aqueous inkjet ink to cause aggregation, and/or insolubilize a resin contained in the aqueous inkjet ink to thicken the aqueous inkjet ink. The aggregating agent used in the pretreatment liquid to be combined with the ink of the present invention preferably contains one or more selected from a metal salt and a cationic polymer compound from the viewpoint of significantly improving printed image quality. In particular, a metal salt is preferably used as the aggregating agent, and the aggregating agent particularly preferably contains a salt of one or more polyvalent metal ions selected from the group consisting of $Ca^{2+}$, $Mg^{2+}$, $Zn^{2+}$, and $Al^{3+}$ from the viewpoint of obtaining excellent printed image quality. Note that, when a metal salt is used as the aggregating agent, the content thereof is preferably 2 to 30% by mass and particularly preferably 3 to 25% by mass, with respect to the total amount of the pretreatment liquid.

In addition, a water-soluble organic solvent, a surfactant, a pH adjuster, an antifoaming agent, a thickener, a preservative, and the like can be appropriately added to the pretreatment liquid. Note that the water-soluble organic solvent and the surfactant that can be used in the pretreatment liquid are similar to those in the case of the ink described above. In addition, when the pretreatment liquid contains a surfactant, the pretreatment liquid preferably contains the unmodified acetylene diol-based surfactant (A1) and the alkylene oxide-modified acetylene diol-based surfactant (A2) having an HLB value of 4 to 10 from the viewpoint of obtaining a printed matter excellent in blocking resistance and migration resistance.

<Printing Substrate>

As described above, the ink of the present invention can be particularly preferably used for a non-absorbent substrate, such as a film. Specific examples thereof include: a polyolefin-based resin such as polyethylene, biaxially oriented polypropylene (OPP), and non-axially oriented polypropylene (CPP); a polyester-based resin such as polyethylene terephthalate (PET), polycarbonate, and polylactic acid; a polystyrene-based resin such as polystyrene, an AS resin, and an ABS resin; a polyamide-based resin such as nylon; a chlorine-containing resin such as polyvinyl chloride and polyvinylidene chloride; cellophane; and a film-like or sheet-like substrate made of a composite material of these. These printing substrates may be subjected to a surface treatment, such as a corona treatment or a plasma treatment. In addition, these printing substrates may be subjected to a precoating treatment with a precoating composition containing one or more resins selected from the group consisting of a urethane-based resin, an acrylic-based resin, and an olefin-based resin (Note that the precoating composition is different from the pretreatment liquid described above.).

<Method for Manufacturing Printed Matter>

The ink of the present invention is used in a printing method in which the ink is discharged from a nozzle of an inkjet head and droplets of the ink are attached onto a substrate.

After the ink of the present invention is applied onto a substrate, the ink on the substrate is preferably dried by a drying mechanism. Examples of a drying method used in the drying mechanism include a heating drying method, a hot air drying method, an infrared ray (for example, an infrared ray having a wavelength of 700 to 2500 nm) drying method, a microwave drying method, and a drum drying method. In addition, the drying methods may be used singly, or the plurality of drying methods may be used continuously, or may be used simultaneously in combination. For example, by using the heat drying method and the hot air drying method in combination, the ink can be dried more quickly than when each of the methods is used singly. In the embodiment of the present invention, a printed matter includes a substrate and a printing layer formed by printing the ink of the present invention on the substrate. The printing layer may include an image and/or a text.

<Post-Coating Treatment>

In a printed matter manufactured using the ink of the present invention, a printed surface can be subjected to a post-coating treatment as necessary. Specific examples of the post-coating treatment include application or printing of a post-coating composition, and lamination by a dry laminating method, a solvent-free laminating method, an extrusion laminating method, or the like. Any one of these may be selected, or a plurality of these may be combined.

Note that, when a printed matter is subjected to a post-coating treatment by applying and printing a post-coating composition, as the application and printing method, either a method for printing the post-coating composition while the post-coating composition is in non-contact with a printing substrate like inkjet printing or a method for printing the post-coating composition while the post-coating composition is in contact with a printing substrate may be adopted. When a method for printing the post-coating composition while the post-coating composition is in non-contact with a printing substrate is selected, it is preferable to use an ink (clear ink) excluding a pigment from the ink of the present invention and substantially containing no colorant component.

When a printed matter is subjected to lamination, an adhesive used for laminating a sealant substrate is preferably formed of a mixture of a polyol component and a polyisocyanate component.

The polyol component is a resin component having a plurality of hydroxy groups, and a polyurethane resin or a polyester resin is preferably used in view of coatability, wet-spreading ability and permeability to a printed matter interface, and lamination strength developed after aging. In particular, the polyol component preferably contains a polyester polyol from the viewpoint of having favorable wet-spreading ability to an interface of a printed matter obtained by the ink of the present invention, for example, a printing layer (printing portion) and a pretreatment liquid layer (non-printing portion), and further having excellent lamination strength of a laminated printed matter (laminated body). Note that, as the polyol component, a single component may be used, or a plurality of components may be used in combination.

The polyisocyanate component reacts with the polyol component to form a urethane bond, thereby increasing the molecular weight of an adhesive layer and improving the lamination strength. In particular, the polyisocyanate component preferably contains a polyether-based urethane resin having a terminal isocyanate group from the viewpoint of compatibility with a polyol component, wet-spreading ability to an interface of a printed matter obtained by the ink of the present invention, and lamination strength of a laminated printed matter (laminated body). In addition, the amount of the polyisocyanate component is preferably 50 to 80% by mass with respect to the polyol component from a similar viewpoint to the above. Note that, as the polyisocyanate component, a single component may be used, or a plurality of components may be used in combination.

Note that examples of a sealant substrate used in the above lamination include a polypropylene film and a polyethylene film, such as a CPP film and a linear short-chain branched polyethylene (LLDPE) film. In addition, a film on which a vapor deposited layer of a metal (oxide), such as aluminum oxide, is formed may be used.

Example of Embodiment

An embodiment of the present invention includes aqueous inkjet inks described in the following [1] to [5], and a printed matter manufactured using any one of the aqueous inkjet inks, described in the following [6].

[1] An aqueous inkjet ink containing a pigment, a binder resin, a water-soluble organic solvent, and an acetylene diol-based surfactant (A), wherein
  the acetylene diol-based surfactant (A) contains an unmodified acetylene diol-based surfactant (A1) and an alkylene oxide-modified acetylene diol-based surfactant (A2) having an HLB value of 4 to 10,
  a content of the unmodified acetylene diol-based surfactant (A1) is 5 to 2,000 ppm with respect to the total amount of the aqueous inkjet ink,
  a content of the alkylene oxide-modified acetylene diol-based surfactant (A2) is 0.2 to 5% by mass with respect to the total amount of the aqueous inkjet ink, and
  a ratio between the content of the unmodified acetylene diol-based surfactant (A1) and the content of the alkylene oxide-modified acetylene diol-based surfactant (A2) [surfactant (A2)/surfactant (A1)] is within a range of 10 to 5,000.

[2] The aqueous inkjet ink according to [1], further containing a nonionic surfactant (B) other than the acetylene diol-based surfactant.

[3] The aqueous inkjet ink according to [2], wherein a mass factor-added HLB value calculated by the following Formula (1) is 0.3 to 2.0.

[Mathematical Formula 2]

$$[\text{Mass factor} - \text{added } HLB \text{ value}] = \frac{\sum_{i=1}^{l}(HLB_i \times WT_i) + \sum_{j=1}^{m}(HLB_j \times WT_j)}{\sum_{k=1}^{n}(HLB_k \times WT_k)}$$

(wherein i represents the type of surfactant used as the unmodified acetylene diol-based surfactant (A1), and l represents the number of types of surfactants used as the unmodified acetylene diol-based surfactant (A1). j represents the type of surfactant used as the alkylene oxide-modified acetylene diol-based surfactant (A2), and m represents the number of types of surfactants used as the alkylene oxide-modified acetylene diol-based surfactant (A2). k represents the type of surfactant used as the nonionic surfactant (B), and n represents the number of types of surfactants used as the nonionic surfactant (B). $HLB_i$ represents an HLB value of the surfactant i, $WT_i$ represents the content (% by mass) of the surfactant i with respect to the total mass of the aqueous inkjet ink, $HLB_j$ represents an HLB value of the surfactant j, $WT_j$ represents the content (% by mass) of the surfactant j with respect to the total mass of the aqueous inkjet ink, $HLB_k$ represents an HLB value of the surfactant k, and $WT_k$ represents the content (% by mass) of the surfactant k with respect to the total mass of the aqueous inkjet ink.)

[4] The aqueous inkjet ink according to [2] or [3], wherein the nonionic surfactant (B) contains a silicon-based surfactant.

[5] The aqueous inkjet ink according to any one of [1] to [4], wherein the water-soluble organic solvent contains 1,2-propanediol, and the content of the 1,2-propanediol is 5 to 30% by mass with respect to the total amount of the aqueous inkjet ink.

[6] A printed matter obtained by printing the aqueous inkjet ink according to any one of [1] to [5] on a printing substrate.

The disclosure of the present application relates to subject matters described in Japanese Patent Application No. 2023-198145 filed on Nov. 22, 2023, the entire disclosure of which is incorporated herein by reference.

EXAMPLES

Hereinafter, the present invention will be described more specifically with reference to Examples and Comparative Examples. Note that, in the following description, "parts" and "%" are on a mass basis unless otherwise specified.

<Manufacture Example of Water-Based Pigment Dispersing Resin Solution 1>

Into a reaction vessel equipped with a gas introduction tube, a thermometer, a condenser, and a stirrer, 90 parts of butanol was added, and the inside of the reaction vessel was replaced with nitrogen gas. Subsequently, the inside of the reaction vessel was heated to 110° C., and then a mixture of 30 parts of acrylic acid, 35 parts of behenyl acrylate, and 35 parts of styrene, which are polymerizable monomers, and 4 parts of V-601 (manufactured by FUJIFILM Wako Pure Chemical Corporation) as a polymerization initiator was added dropwise into the reaction vessel over two hours. After completion of the dropwise addition, a polymerization reaction was continued for three hours while the internal temperature was maintained at 110° C. Thereafter, 0.4 parts of V-601 was added thereto, and the polymerization reaction was continued for one hour while the internal temperature of the reaction vessel was maintained at 110° C., thereby obtaining a solution of a pigment dispersing resin 1.

Subsequently, the content in the reaction vessel was cooled to normal temperature, and then 38 parts of dimethylaminoethanol was added thereto to neutralize the pigment dispersing resin 1, and then 100 parts of ion-exchanged water was further added thereto. Thereafter, the content was heated to 100° C. or higher, butanol was azeotroped with ion-exchanged water to distill off the butanol, and then ion-exchanged water was added thereto to adjust the solid content concentration to 50%, thereby obtaining a water-based pigment dispersing resin solution 1 having a solid content concentration of 50%. Note that the obtained pigment dispersing resin 1 had a molecular weight of 16,000 and an acid value of 234 mgKOH/g.

<Manufacture Example of Water-Based Pigment Dispersing Resin Solution 2>

Into a reaction vessel equipped with a gas introduction tube, a thermometer, a condenser, and a stirrer, 56 parts of 2-butanone was added. Subsequently, 56 parts of benzyl methacrylate as a polymerizable monomer, 0.3 parts of 2,2'-azobisisobutyronitrile as a polymerization initiator, and 2.2 parts of 2-(dodecylthiocarbonothioylthio)-isobutyric acid were added thereto. The inside of the reaction vessel was replaced with nitrogen gas, then the content in the reaction vessel was heated to 75° C., and then a polymerization reaction was performed for three hours while the internal temperature was maintained at 75° C., thereby obtaining a polymer (block A) formed of benzyl methacrylate. After completion of the polymerization reaction, the content was cooled to normal temperature, and then 44 parts of 2-butanone, 28 parts of butyl methacrylate, and 16 parts of methacrylic acid were added to the reaction vessel. The inside of the reaction vessel was replaced with nitrogen gas again, then the content in the reaction vessel was heated to 75° C., and then a polymerization reaction was performed for three hours while the internal temperature was maintained at 75° C., thereby obtaining a pigment dispersing resin 2 having an A-B block structure in which a copolymer (block B) formed of butyl methacrylate and methacrylic acid was added to the block A.

Thereafter, the content in the reaction vessel was cooled to normal temperature, and then 17 parts of dimethylaminoethanol was added thereto to neutralize the pigment dispersing resin 2, and then 150 parts of ion-exchanged water was further added thereto. Thereafter, the content was heated, 2-butanone was azeotroped with ion-exchanged water to distill off the 2-butanone, and then ion-exchanged water was added thereto to adjust a solid content concentration to 50%, thereby obtaining a water-based pigment dispersing resin solution 2 having a solid content concentration of 50%. Note that the obtained pigment dispersing resin had a molecular weight of 23,000 and an acid value of 104 mgKOH/g.

<Manufacture Example of Cyan Pigment Dispersion 1>

20 parts of LIONOGEN BLUE FG-7358G (C.I. Pigment Blue 15:3 manufactured by Toyocolor Co., Ltd.), 15 parts of the water-based pigment dispersing resin solution 1, and 65 parts of ion-exchanged water were mixed and preliminarily dispersed with a dispersing mixer, and then main dispersion was performed using a 0.6 L dyno mill filled with 1,800 g of zirconia beads having a diameter of 0.5 mm to obtain a cyan pigment dispersion 1.

<Manufacture Example of Cyan Pigment Dispersion 2>

A cyan pigment dispersion 2 was manufactured by the same raw materials and methods to those of the cyan pigment dispersion 1 except that the water-based pigment dispersing resin solution 2 was used instead of the water-based pigment dispersing resin solution 1.

<Manufacture Example of Binder Resin 1>

Into a reaction vessel equipped with a gas introduction tube, a thermometer, a condenser, and a stirrer, 72.4 parts of 2-butanone was added, and the inside of the reaction vessel was replaced with nitrogen gas. Subsequently, the inside of the reaction vessel was heated to 80° C., and then a mixture of 15 parts of styrene, 4.5 parts of methacrylic acid, 5.0 parts of 2-hydroxyethyl methacrylate, 20 parts of stearyl methacrylate, and 55.5 parts of methyl methacrylate, which are polymerizable monomers, and 4 parts of V-601 (manufactured by FUJIFILM Wako Pure Chemical Corporation) as a polymerization initiator was added dropwise into the reaction vessel over two hours. After completion of the dropwise addition, a polymerization reaction was continued for three hours while the internal temperature was maintained at 80° C. Thereafter, 0.6 parts of V-601 was added thereto, and the polymerization reaction was continued for two hour while the internal temperature was maintained at 80° C., thereby obtaining a solution of a binder resin 1.

Subsequently, the content in the reaction vessel was cooled to 50° C., and then 4.7 parts of dimethylaminoethanol was added thereto to neutralize the binder resin 1, and then 140 parts of water was further added thereto. Thereafter, the content was heated to 78° C. or higher, 2-butanone was azeotroped with water to distill off the 2-butanone, and then water was added thereto to adjust a solid content concentration to 30%, thereby obtaining a water-based binder resin 1 solution having a solid content concentration of 30%. Note that the obtained binder resin 1 had a weight average molecular weight of 17,000.

<Synthesis of Unmodified Acetylene Diol-Based Surfactant (A1)>

By using a method described in Example 1 of JP 2002-356451 A and using methyl isobutyl ketone as a raw material ketone, 2,4,7,9-tetramethyl-5-decine-4,7-diol (unmodified acetylene diol-based compound 1, HLB value=3.0) was synthesized. In the same manner, by using methyl isoamyl ketone as a raw material ketone, 2,5,8,11-tetramethyl-6-dodecine-5,8-diol (unmodified acetylene diol-based compound 2, HLB value=2.7) was synthesized.

<Synthesis of Alkylene Oxide-Modified Acetylene Diol-Based Surfactant (A2)>

By using a method described in Example 1 of U.S. Pat. No. 3,268,593, using the unmodified acetylene diol-based compound 1 (2,4,7,9-tetramethyl-5-decine-4,7-diol) as a starting material, and adjusting the amount of ethylene oxide and synthesis conditions (pressure, temperature, and time), alkylene oxide-modified acetylene diol-based surfactants (modified acetylene diol-based compounds 1 to 4 and 6 to 11) having different ethylene oxide modification amounts were synthesized. In addition, by using the unmodified acetylene diol-based compound 2 (2,5,8,11-tetramethyl-6-dodecine-5,8-diol) as a starting material and adjusting the amount of ethylene oxide and synthesis conditions (pressure, temperature, and time), an ethylene oxide-modified acetylene diol-based surfactant having an HLB value of 8 (modified acetylene diol-based compound 5) was synthesized. Furthermore, by using a method described in Example 1 of JP 2001-215690 A and using the modified acetylene diol-based compounds 7 and 9 as starting materials, ethylene oxide-propylene oxide-modified acetylene diol-based surfactants (modified acetylene diol-based compounds 12 and 13) where a propylene oxide group was added to each of the modified acetylene diol-based compounds 7 and 9 were synthesized.

Note that details (starting material, number of added moles of ethylene oxide groups (and propylene oxide groups), and HLB value) of each of the modified acetylene diol-based compounds 1 to 13 manufactured above are as illustrated in Table 1 below.

TABLE 1

| Alkylene oxide-modified acetylene diol-based surfactant | Starting material | HLB value | Addition amount (mol) Ethylene oxide group | Addition amount (mol) Propylene oxide group | Molecular weight |
|---|---|---|---|---|---|
| Modified acetylene diol-based compound 1 | Unmodified acetylene diol-based compound 1 | 3.8 | 1.2 | — | 279 |
| Modified acetylene diol-based compound 2 | | 6.1 | 2.3 | — | 326 |
| Modified acetylene diol-based compound 3 | | 7.0 | 2.8 | — | 348 |
| Modified acetylene diol-based compound 4 | | 8.2 | 3.6 | — | 384 |
| Modified acetylene diol-based compound 5 | Unmodified acetylene diol-based compound 2 | 8 | 3.9 | — | 410 |
| Modified acetylene diol-based compound 6 | Unmodified acetylene diol-based compound 1 | 8.9 | 4.1 | — | 408 |
| Modified acetylene diol-based compound 7 | | 9.2 | 4.4 | — | 420 |
| Modified acetylene diol-based compound 8 | | 10.0 | 5.1 | — | 453 |
| Modified acetylene diol-based compound 9 | | 10.9 | 6.2 | — | 499 |
| Modified acetylene diol-based compound 10 | | 12.1 | 7.9 | — | 573 |
| Modified acetylene diol-based compound 11 | | 16.0 | 20.6 | — | 1132 |
| Modified acetylene diol-based compound 12 | Modified acetylene diol-based compound 7 | 7.2 | 4.4 | 2.0 | 536 |
| Modified acetylene diol-based compound 13 | Modified acetylene diol-based compound 9 | 8.9 | 6.2 | 2.0 | 615 |

<Manufacture Example of Ink 1>

Into a mixing vessel, 35.6 parts of ion-exchanged water, 20 parts of 1,2-propanediol, 1.5 parts of the modified acetylene diol-based compound 4, 1.0 part of BYK-349 (silicon-based surfactant manufactured by BYK-Chemie GmbH, HLB value=10.2), 0.2 parts of TEGO Glide100 (silicon-based surfactant manufactured by Evonik, HLB value=6.8), 16.7 parts of the water-based binder resin 1 solution, and 25 parts of the cyan pigment dispersion 1 were sequentially added, and then the mixture was stirred with a dispersing mixer until the mixture became sufficiently uniform. Thereafter, filtration was performed with a membrane filter having a pore size of 1 μm to remove coarse particles that cause head clogging, thereby an ink 1 was prepared.

<Manufacture Examples of Inks 2 to 105>

Inks 2 to 105 were prepared in the same manner to Manufacture Example of the ink 1 except that raw materials described in Table 2 were used.

| Ink No. | | | 1 | 2 | 3 | 4 | 5 | 6 | 7 | 8 | 9a |
|---|---|---|---|---|---|---|---|---|---|---|---|
| Pigment dispersion | Cyan pigment dispersion 1 | Pigment concentration: 20% | 25.0 | 25.0 | 25.0 | 25.0 | 25.0 | 25.0 | 25.0 | 25.0 | 25.0 |
| Binder resin | Binder resin 1 water-based solution | Nv: 30% | 16.7 | 16.7 | 16.7 | 16.7 | 16.7 | 16.7 | 16.7 | 16.7 | 16.7 |

-continued

| Component | | | | | | | | | | | | |
|---|---|---|---|---|---|---|---|---|---|---|---|---|
| Acetylene diol-based surfactant (A) | Unmodified acetylene diol-based surfactant (A1) | Unmodified acetylene diol-based compound 1 | HLB: 3.0 | | 0.001 | 0.005 | 0.01 | 0.05 | 0.1 | 0.2 | 0.25 | 0.0005 |
| | | Unmodified acetylene diol-based compound 2 | HLB: 2.7 | | | | | | | | | |
| | Alkylene oxide-modified acetylene diol-based surfactant (A2) | Modified acetylene diol-based compound 4 | HLB: 8.2 | 1.5 | 0.8 | 0.8 | 0.8 | 2.5 | 2.5 | 2.5 | 2.5 | 1.5 |
| Nonionic surfactant (B) | Silicon-based surfactant | BYK 349 | HLB: 10.2 | 1 | 0.5 | 0.5 | 0.5 | 1.6 | 1.6 | 1.6 | 1.6 | 1 |
| | | TEGO Glide100 | HLB: 6.8 | 0.2 | 0.2 | 0.2 | 0.2 | 0.2 | 0.2 | 0.2 | 0.2 | 0.2 |
| Water-soluble organic solvent | | 1,2-PG | | 20 | 20 | 20 | 20 | 20 | 20 | 20 | 20 | 20 |
| | | Ion exchanged water | | 35.6 | 36.8 | 36.8 | 36.8 | 34.0 | 33.9 | 33.8 | 33.8 | 35.6 |
| | | Content of acetylene diol-based surfactant (A1) [ppm] | | 0 | 10 | 50 | 100 | 500 | 1000 | 2000 | 2500 | 5 |
| | | Content of acetylene diol-based surfactant (A2) | | 1.5 | 0.8 | 0.8 | 0.8 | 2.5 | 2.5 | 2.5 | 2.5 | 1.5 |
| | | Amount ratio of [acetylene diol-based surfactant (A2)/acetylene diol-based surfactant (A1)] | | — | 800 | 160 | 80 | 50 | 25 | 12.5 | 10 | 3000 |
| | | Amount ratio of [nonionic surfactant (B)/acetylene diol-based surfactant (A2) + acetylene diol-based surfactant (A1)] | | 0.80 | 0.87 | 0.87 | 0.86 | 0.71 | 0.69 | 0.67 | 0.65 | 0.80 |
| | | Mass factor-added HLB value | | 1.28 | 1.28 | 1.28 | 1.28 | 1.27 | 1.27 | 1.27 | 1.27 | 1.28 |

| Component | | | | Ink No. | | | | | | | | |
|---|---|---|---|---|---|---|---|---|---|---|---|---|
| | | | | 9 | 10 | 11 | 12 | 13 | 14 | 15 | 16 | 17 |
| Pigment dispersion | Cyan pigment dispersion 1 | | Pigment concentration: 20% | 25.0 | 25.0 | 25.0 | 25.0 | 25.0 | 25.0 | 25.0 | 25.0 | 25.0 |
| Binder resin | Binder resin 1 water-based solution | | Nv: 30% | 16.7 | 16.7 | 16.7 | 16.7 | 16.7 | 16.7 | 16.7 | 16.7 | 16.7 |
| Acetylene diol-based surfactant (A) | Unmodified acetylene diol-based surfactant (A1) | Unmodified acetylene diol-based compound 1 | HLB: 3.0 | 0.001 | 0.005 | 0.01 | 0.05 | 0.1 | 0.2 | 0.2 | 0.25 | |
| | | Unmodified acetylene diol-based compound 2 | HLB: 2.7 | | | | | | | | | 0.01 |
| | Alkylene oxide-modified acetylene diol-based surfactant (A2) | Modified acetylene diol-based compound 4 | HLB: 8.2 | 1.5 | 1.5 | 1.5 | 1.5 | 1.5 | 1.5 | 2 | 2 | 1.5 |
| Nonionic surfactant (B) | Silicon-based surfactant | BYK 349 | HLB: 10.2 | 1 | 1 | 1 | 1 | 1 | 1 | 1 | 1 | 1 |
| | | TEGO Glide100 | HLB: 6.8 | 0.2 | 0.2 | 0.2 | 0.2 | 0.2 | 0.2 | 0.2 | 0.2 | 0.2 |
| Water-soluble organic solvent | | 1,2-PG | | 20 | 20 | 20 | 20 | 20 | 20 | 20 | 20 | 20 |

-continued

| | | | | | | | | | | | |
|---|---|---|---|---|---|---|---|---|---|---|---|
| Ion exchanged water | | | 35.6 | 35.6 | 35.6 | 35.6 | 35.5 | 35.4 | 34.9 | 34.9 | 35.6 |
| Content of acetylene diol-based surfactant (A1) [ppm] | | | 10 | 50 | 100 | 500 | 1000 | 2000 | 2000 | 2500 | 100 |
| Content of acetylene diol-based surfactant (A2) | | | 1.5 | 1.5 | 1.5 | 1.5 | 1.5 | 1.5 | 2 | 2 | 1.5 |
| Amount ratio of [acetylene diol-based surfactant (A2)/acetylene diol-based surfactant (A1)] | | | 1500 | 300 | 150 | 30 | 15 | 7.5 | 10 | 8 | 150 |
| Amount ratio of [nonionic surfactant (B)/acetylene diol-based surfactant (A2) + acetylene diol-based surfactant (A1)] | | | 0.80 | 0.80 | 0.79 | 0.77 | 0.75 | 0.71 | 0.55 | 0.53 | 0.79 |
| Mass factor-added HLB value | | | 1.28 | 1.28 | 1.28 | 1.28 | 1.28 | 1.28 | 1.27 | 1.27 | 1.28 |

| | | | Ink No. | | | | | | | | | | |
|---|---|---|---|---|---|---|---|---|---|---|---|---|---|
| | | | 18 | 19 | 20 | 21 | 22 | 23 | 24 | 25 | 26 | 27 | 28 |
| Pigment dispersion | Cyan pigment dispersion 1 | Pigment concentration: 20% | 25.0 | 25.0 | 25.0 | 25.0 | 25.0 | 25.0 | 25.0 | 25.0 | 25.0 | 25.0 | 25.0 |
| Binder resin | Binder resin 1 water-based solution | Nv: 30% | 16.7 | 16.7 | 16.7 | 16.7 | 16.7 | 16.7 | 16.7 | 16.7 | 16.7 | 16.7 | 16.7 |
| Acetylene diol-based surfactant (A1) | Unmodified acetylene diol-based surfactant (A1) | Unmodified acetylene diol-based compound 1, HLB: 3.0 | 0.01 | 0.01 | 0.01 | 0.01 | 0.01 | 0.01 | 0.01 | 0.01 | 0.01 | 0.01 | 0.01 |
| | Alkylene oxide-modified acetylene diol-based surfactant (A2) | Modified acetylene diol-based compound 1, HLB: 3.8 | 1.5 | | | | | | | | | | |
| | | Modified acetylene diol-based compound 2, HLB: 6.1 | | 1.5 | | | | | | | | | |
| | | Modified acetylene diol-based compound 3, HLB: 7.0 | | | 1.5 | | | | | | | | |
| | | Modified acetylene diol-based compound 4, HLB: 8.2 | | | | 1.5 | | | | | | | |
| | | Modified acetylene diol-based compound 5, HLB: 8.0 | | | | | 1.5 | | | | | | |
| | | Modified acetylene diol-based compound 6, HLB: 8.9 | | | | | | 1.5 | | | | | |
| | | Modified acetylene diol-based compound 7, HLB: 9.2 | | | | | | | 1.5 | | | | |
| | | Modified acetylene diol-based compound 8, HLB: 10.0 | | | | | | | | 1.5 | | | |
| | | Modified acetylene diol-based compound 12, HLB: 7.2 | | | | | | | | | 1.5 | | |

-continued

| | | | | | | | | | | | | | |
|---|---|---|---|---|---|---|---|---|---|---|---|---|---|
| | | Modified acetylene diol-based compound 13 | HLB: 8.9 | | | | | | | | | | 1.5 |
| | Other acetylene diol-based surfactants | Modified acetylene diol-based compound 9 | HLB: 10.9 | | | | | | | | | | 1.5 |
| | | Modified acetylene diol-based compound 10 | HLB: 12.1 | | | | | | | | | | 1.5 |
| | | Modified acetylene diol-based compound 11 | HLB: 16.0 | | | | | | | | | | |
| Non-ionic surfactant (B) | Silicon-based surfactant | BYK 349 | HLB: 10.2 | 1 | 1 | 1 | 1 | 1 | 1 | 1 | 1 | 1 | 1 | 1 |
| | | TEGO Glide100 | HLB: 6.8 | 0.2 | 0.2 | 0.2 | 0.2 | 0.2 | 0.2 | 0.2 | 0.2 | 0.2 | 0.2 | 0.2 |
| Water-soluble organic solvent | | 1.2-PG | | 20 | 20 | 20 | 20 | 20 | 20 | 20 | 20 | 20 | 20 | 20 |
| | | Ion exchanged water | | 35.6 | 35.6 | 35.6 | 35.6 | 35.6 | 35.6 | 35.6 | 35.6 | 35.6 | 35.6 | 35.6 |
| | | Content of acetylene diol-based surfactant (A1) [ppm] | | 100 | 100 | 100 | 100 | 100 | 100 | 100 | 100 | 100 | 100 | 100 |
| | | Content of acetylene diol-based surfactant (A2) | | 1.5 | 1.5 | 1.5 | 1.5 | 1.5 | 1.5 | 1.5 | 1.5 | 1.5 | 1.5 | 1.5 |
| | | Amount ratio of [acetylene diol-based surfactant (A2)/ acetylene diol-based surfactant (A1)] | | 150 | 150 | 150 | 150 | 150 | 150 | 150 | 150 | 150 | 150 | 150 |
| | | Amount ratio of [nonionic surfactant (B)/acetylene diol-based surfactant (A2) + acetylene diol-based surfactant (A1)] | | 0.79 | 0.79 | 0.79 | 0.79 | 0.79 | 0.79 | 0.79 | 0.79 | 0.79 | 0.79 | 0.79 |

| | | | | Ink No. | | | | | | | | | |
|---|---|---|---|---|---|---|---|---|---|---|---|---|---|
| | | | | | 29 | 30 | 31 | 32 | 33 | 34 | 35 | 36 | 37 | 38 |
| Pigment dispersion | Cyan pigment dispersion 1 | | Pigment concentration: 20% | | 25.0 | 25.0 | 25.0 | 25.0 | 25.0 | 25.0 | 25.0 | 25.0 | 25.0 | 25.0 |
| Binder resin | Binder resin 1 water-based solution | | Nv: 30% | | 16.7 | 16.7 | 16.7 | 16.7 | 16.7 | 16.7 | 16.7 | 16.7 | 16.7 | 16.7 |
| Acetylene diol-based surfactant (A) | Unmodified acetylene diol-based surfactant (A1) | Unmodified acetylene diol-based compound 1 | HLB: 3.0 | | 0.01 | 0.01 | 0.005 | 0.01 | 0.01 | 0.01 | 0.01 | 0.02 | 0.02 | 0.02 |
| | Alkylene oxide-modified acetylene diol-based surfactant (A2) | Modified acetylene diol-based compound 1 | HLB: 3.8 | | | | | | | | | | | |
| | | Modified acetylene diol-based compound 2 | HLB: 6.1 | | | | | | | | | | | |
| | | Modified acetylene diol-based compound 3 | HLB: 7.0 | | | | | | | | | | | |
| | | Modified acetylene diol-based compound 4 | HLB: 8.2 | | | 0.1 | 0.3 | 0.5 | 0.7 | 1 | 2 | 3.5 | 5 | 6 |

-continued

| | | | | | | | | | | | | |
|---|---|---|---|---|---|---|---|---|---|---|---|---|
| | | Modified acetylene diol-based compound 5 | HLB: 8.0 | | | | | | | | | |
| | | Modified acetylene diol-based compound 6 | HLB: 8.9 | | | | | | | | | |
| | | Modified acetylene diol-based compound 7 | HLB: 9.2 | | | | | | | | | |
| | | Modified acetylene diol-based compound 8 | HLB: 10.0 | | | | | | | | | |
| | | Modified acetylene diol-based compound 12 | HLB: 7.2 | | | | | | | | | |
| | | Modified acetylene diol-based compound 13 | HLB: 8.9 | | | | | | | | | |
| | Other acetylene diol-based surfactants | Modified acetylene diol-based compound 9 | HLB: 10.9 | | | | | | | | | |
| | | Modified acetylene diol-based compound 10 | HLB: 12.1 | | | | | | | | | |
| | | Modified acetylene diol-based compound | HLB: 16.0 | 1.5 | | | | | | | | |
| Non-ionic surfactant (B) | Silicon-based surfactant | BYK 349 | HLB: 10.2 | 1 | 1 | 0.15 | 0.3 | 0.5 | 0.8 | 1.2 | 2.2 | 3.2 | 4 |
| | | TEGO Glide100 | HLB: 6.8 | 0.2 | 0.2 | 0.2 | 0.2 | 0.2 | 0.2 | 0.2 | 0.2 | 0.2 | 0.2 |
| Water-soluble organic solvent | | 1.2-PG | | 20 | 20 | 20 | 20 | 20 | 20 | 20 | 20 | 20 | 20 |
| | Ion exchanged water | | | 35.6 | 37.0 | 37.7 | 37.3 | 36.9 | 36.3 | 34.9 | 32.4 | 29.9 | 28.1 |
| | Content of acetylene diol-based surfactant (A1) [ppm] | | | 100 | 100 | 50 | 100 | 100 | 100 | 100 | 200 | 200 | 200 |
| | Content of acetylene diol-based surfactant (A2) | | | 1.5 | 0.1 | 0.3 | 0.5 | 0.7 | 1 | 2 | 3.5 | 5 | 6 |
| | Amount ratio of [acetylene diol-based surfactant (A2)/ acetylene diol-based surfactant (A1)] | | | 150 | 10 | 60 | 50 | 70 | 100 | 200 | 175 | 250 | 300 |
| | Amount ratio of [nonionic surfactant (B)/acetylene diol-based surfactant (A2) + acetylene diol-based surfactant (A1)] | | | 0.79 | 10.91 | 1.15 | 0.98 | 0.99 | 0.99 | 0.70 | 0.68 | 0.68 | 0.70 |

| | | | Ink No. | 39 | 40 | 41 | 42 | 43 | 44 | 45 | 46 | 47 |
|---|---|---|---|---|---|---|---|---|---|---|---|---|
| Pigment dispersion | Cyan pigment dispersion 1 | Pigment concentration: 20% | | 25.0 | 25.0 | 25.0 | 25.0 | 25.0 | 25.0 | 25.0 | 25.0 | 25.0 |
| Binder resin | Binder resin 1 water-based solution | Nv: 30% | | 16.7 | 16.7 | 16.7 | 16.7 | 16.7 | 16.7 | 16.7 | 16.7 | 16.7 |

-continued

| Category | Sub | Name | HLB | | | | | | | | | |
|---|---|---|---|---|---|---|---|---|---|---|---|---|
| Acetylene diol-based surfactant (A) | Unmodified acetylene diol-based surfactant (A1) | Unmodified acetylene diol-based compound 1 | HLB: 3.0 | 0.01 | 0.01 | 0.01 | 0.01 | 0.01 | 0.01 | 0.01 | 0.01 | 0.01 |
| | Alkylene oxide-modified acetylene diol-based surfactant (A2) | Modified acetylene diol-based compound 4 | HLB: 8.2 | 0.3 | 0.5 | 0.75 | 1 | 2 | 3.5 | 3.5 | 5 | 6 |
| Nonionic surfactant (B) | Silicon-based surfactant | BYK 349 | HLB: 10.2 | 1 | 1 | 1 | 1 | 1 | 1 | 1.5 | 1 | 1 |
| | | TEGO Glide100 | HLB: 6.8 | 0.2 | 0.2 | 0.2 | 0.2 | 0.2 | 0.2 | 0.2 | 0.2 | 0.2 |
| Water-soluble organic solvent | | 1.2-PG | | 20 | 20 | 20 | 20 | 20 | 20 | 20 | 20 | 20 |
| | | Ion exchanged water | | 36.8 | 36.6 | 36.4 | 36.1 | 35.1 | 33.6 | 33.1 | 32.1 | 31.1 |
| | | Content of acetylene diol-based surfactant (A1) [ppm] | | 100 | 100 | 100 | 100 | 100 | 100 | 100 | 100 | 100 |
| | | Content of acetylene diol-based surfactant (A2) | | 0.3 | 0.5 | 0.75 | 1 | 2 | 3.5 | 3.5 | 5 | 6 |
| | | Amount ratio of [acetylene diol-based surfactant (A2)/acetylene diol-based surfactant (A1)] | | 30 | 50 | 75 | 100 | 200 | 350 | 350 | 500 | 600 |
| | | Amount ratio of [nonionic surfactant (B)/acetylene diol-based surfactant (A2) + acetylene diol-based surfactant (A1)] | | 3.87 | 2.35 | 1.58 | 1.19 | 0.60 | 0.34 | 0.48 | 0.24 | 0.20 |
| | | Mass factor-added HLB value | | 1.29 | 1.29 | 1.29 | 1.28 | 1.27 | 1.26 | 1.26 | 1.24 | 1.23 |

| Category | Sub | Name | Spec | 48a | 48 | 49 | 60 | 51 | 52 | 53 | 54 |
|---|---|---|---|---|---|---|---|---|---|---|---|
| Pigment dispersion | Cyan pigment dispersion 1 | | Pigment concentration: 20% | 25.0 | 25.0 | 25.0 | 25.0 | 25.0 | 25.0 | 25.0 | 25.0 |
| Binder resin | Binder resin 1 water-based solution | | Nv: 30% | 16.7 | 16.7 | 16.7 | 16.7 | 16.7 | 16.7 | 16.7 | 16.7 |
| Acetylene diol-based surfactant (A) | Unmodified acetylene diol-based surfactant (A1) | Unmodified acetylene diol-based compound 1 | HLB: 3.0 | 0.0005 | 0.001 | 0.001 | 0.005 | 0.01 | 0.04 | 0.1 | 0.1 |
| | Alkylene oxide-modified acetylene diol-based surfactant (A2) | Modified acetylene diol-based compound 4 | HLB: 8.2 | 2.4 | 5 | 2 | 1.5 | 1 | 2 | 0.8 | 0.5 |
| Nonionic surfactant (B) | Silicon-based surfactant | BYK 349 | HLB: 10.2 | 1 | 1 | 1 | 1 | 1 | 1 | 1 | 1 |
| | | TEGO Glide100 | HLB: 6.8 | 0.2 | 0.2 | 0.2 | 0.2 | 0.2 | 0.2 | 0.2 | 0.2 |
| Water-soluble organic solvent | | 1.2-PG | | 20 | 20 | 20 | 20 | 20 | 20 | 20 | 20 |
| | | Ion exchanged water | | 34.7 | 32.1 | 35.1 | 35.6 | 36.1 | 35.1 | 36.2 | 36.5 |
| | | Content of acetylene diol-based surfactant (A1) [ppm] | | 5 | 10 | 10 | 50 | 100 | 400 | 1000 | 1000 |
| | | Content of acetylene diol-based surfactant (A2) | | 2.4 | 5 | 2 | 1.5 | 1 | 2 | 0.8 | 0.5 |

-continued

| | | | | | | | | | | |
|---|---|---|---|---|---|---|---|---|---|---|
| Amount ratio of [acetylene diol-based surfactant (A2)/ acetylene diol-based surfactant (A1)] | | | 4800 | 5000 | 2000 | 300 | 100 | 50 | 8 | 5 |
| Amount ratio of [nonionic surfactant (B)/ acetylene diol-based surfactant (A2) + acetylene diol-based surfactant (A1)] | | | 0.50 | 0.24 | 0.60 | 0.80 | 1.19 | 0.59 | 1.33 | 2.00 |
| Mass factor-added HLB value | | | 1.27 | 1.24 | 1.27 | 1.28 | 1.28 | 1.27 | 1.28 | 1.29 |

| | | | | | | | | | |
|---|---|---|---|---|---|---|---|---|---|
| Ink No | | | 55 | 56 | 57 | 58 | 59 | 60 | 61 |
| Pigment dispersion | Cyan pigment dispersion 1 | Pigment concentration: 20% | 25.0 | 25.0 | 25.0 | 25.0 | 25.0 | 25.0 | 25.0 |
| Binder resin | Binder resin 1 water-based solution | Nv: 30% | 16.7 | 16.7 | 16.7 | 16.7 | 16.7 | 16.7 | 16.7 |
| Acetylene diol-based surfactant (A) | Un-modified acetylene diol-based surfactant (A1) | Un-modified acetylene diol-based compound 1 | HLB: 3.0 | 0.01 | 0.01 | 0.01 | 0.01 | 0.01 | 0.01 | 0.01 |
| | Alkylene oxide-modified acetylene diol-based surfactant (A2) | Modified acetylene diol-based compound 4 | HLB: 8.2 | 1.5 | 1.5 | 1.5 | 1.5 | 1.5 | 1.5 | 1.5 |
| Nonionic surfactant (B) | Silicon-based surfactant | BYK 349 | HLB: 10.2 | | 1.2 | | | | | |
| | | BYK 3420 | HLB: 13.8 | | | 1 | | | | |
| | | BYK 3451 | HLB: 10.8 | | | | 1.2 | | | |
| | | TEGO Glide100 | HLB: 6.8 | | | | | 1.5 | | |
| | | TEGO Glide440 | HLB: 12.7 | | | | | | 1.2 | |
| | | TEGO Twin 4200 | HLB: 8.2 | | | | | | | 1.2 |
| Water-soluble organic solvent | | 1.2-PG | 20 | 20 | 20 | 20 | 20 | 20 | 20 |
| | Ion exchanged water | | 36.8 | 35.6 | 35.8 | 35.6 | 35.3 | 35.6 | 35.6 |
| Content of acetylene diol-based surfactant (A1) [ppm] | | | 100 | 100 | 100 | 100 | 100 | 100 | 100 |
| Content of acetylene diol-based surfactant (A2) | | | 1.5 | 1.5 | 1.5 | 1.5 | 1.5 | 1.5 | 1.5 |
| Amount ratio of [acetylene diol-based surfactant (A2)/ acetylene diol-based surfactant (A1)] | | | 150 | 150 | 150 | 150 | 150 | 150 | 150 |
| Amount ratio of [nonionic surfactant (B)/ acetylene diol-based surfactant (A2) + acetylene diol-based surfactant (A1)] | | | — | 0.79 | 0.66 | 0.79 | 0.99 | 0.79 | 0.79 |
| Mass factor-added HLB value | | | 1.27 | 1.28 | 1.28 | 1.28 | 1.28 | 1.28 | 1.28 |

| | | | | | | | | |
|---|---|---|---|---|---|---|---|---|
| Ink No. | | | 62 | 63 | 64 | 65 | 66 | 67 |
| Pigment dispersion | Cyan pigment dispersion 1 | Pigment concentration: 20% | 25.0 | 25.0 | 25.0 | 25.0 | 25.0 | 25.0 |
| Binder resin | Binder resin 1 water-based solution | Nv: 30% | 16.7 | 16.7 | 16.7 | 16.7 | 16.7 | 16.7 |
| Acetylene diol-based surfactant (A) | Un-modified acetylene diol-based surfactant (A1) | Un-modified acetylene diol-based compound 1 | HLB: 3.0 | 0.01 | 0.01 | 0.01 | 0.01 | 0.01 | 0.01 |
| | Alkylene oxide-modified acetylene diol-based | Modified acetylene diol-based | HLB: 8.2 | 1.5 | 1.5 | 1.5 | 1.5 | 1.5 | 1.5 |

-continued

| | | | | | | | | |
|---|---|---|---|---|---|---|---|---|
| | acetylene diol-based surfactant (A2) | compound 4 | | | | | | |
| Non-ionic surfactant (B) | Silicon-based surfactant | BYK 349 | HLB: 10.2 | | | 1 | 1 | 1 | |
| | | BYK 3420 | HLB: 13.8 | 1 | | 0.3 | | | 1 |
| | | BYK 3451 | HLB: 10.8 | | 1 | | 0.5 | | |
| | | TEGO Glide100 | HLB: 6.8 | 0.2 | 0.2 | | | | 0.2 |
| | | TEGO Glide440 | HLB: 12.7 | | | | | 0.2 | |
| | | TEGO Twin 4200 | HLB: 8.2 | | | | | | |
| Water-soluble organic solvent | 1,2-PG | | | 20 | 20 | 20 | 20 | 20 | 20 |
| | Ion exchanged water | | | 35.6 | 35.6 | 35.5 | 35.3 | 35.6 | 35.6 |
| | Content of acetylene diol-based surfactant (A1) [ppm] | | | 100 | 100 | 100 | 100 | 100 | 100 |
| | Content of acetylene diol-based surfactant (A2) | | | 1.5 | 1.5 | 1.5 | 1.5 | 1.5 | 1.5 |
| | Amount ratio of [acetylene diol-based surfactant (A2)/ acetylene diol-based surfactant (A1)] | | | 150 | 150 | 150 | 150 | 150 | 150 |
| | Amount ratio of [nonionic surfactant (B)/ acetylene diol-based surfactant (A2) + acetylene diol-based surfactant (A1)] | | | 0.79 | 0.79 | 0.86 | 0.99 | 0.79 | 0.79 |
| | Mass factor-added HLB value | | | 1.28 | 1.28 | 1.28 | 1.28 | 1.28 | 1.28 |

| | | Ink No. | | 68 | 69 | 70 | 71 | 72 | 73 | 74 | 75 | 76 | 77 |
|---|---|---|---|---|---|---|---|---|---|---|---|---|---|
| Pigment dispersion | Cyan pigment dispersion 1 | | Pigment concentration: 20% | 25.0 | 25.0 | 25.0 | 25.0 | 25.0 | 25.0 | 25.0 | 25.0 | 25.0 | 25.0 |
| Binder resin | Binder resin 1 water-based solution | | Nv: 30% | 16.7 | 16.7 | 16.7 | 16.7 | 16.7 | 16.7 | 16.7 | 16.7 | 16.7 | 16.7 |
| Acetylene diol-based surfactant (A) | Unmodified acetylene diol-based surfactant (A1) | Unmodified acetylene diol-based compound 1 | HLB: 3.0 | 0.01 | 0.01 | 0.01 | 0.01 | 0.01 | 0.01 | 0.01 | 0.01 | 0.01 | 0.01 |
| | Alkylene oxide-modified acetylene diol-based surfactant (A2) | Modified acetylene diol-based compound 4 | HLB: 8.2 | 1.5 | 1.5 | 1.5 | 2 | 2 | 1.5 | 1 | 1 | 1.5 | 1.5 |
| Non-ionic surfactant (B) | Silicon-based surfactant | BYK 349 | HLB: 10.2 | 0.3 | 0.5 | 0.5 | 1.5 | 1.5 | 1.5 | 1.2 | 1.4 | 3 | 4 |
| | | TEGO Glide 100 | HLB: 6.8 | | | 0.2 | | 0.2 | 0.2 | 0.2 | 0.2 | 0.2 | 0.2 |
| | Polyoxyalkylene alkyl ether-based surfactant | BLAUNON EL-1502.2 | HLB: 6.3 | | | | | | | | | | |
| | | BLAUNON EL-1505 | HLB: 10.5 | | | | | | | | | | |
| | | BLAUNON EL-1515 | HLB: 14.9 | | | | | | | | | | |
| | | BLAUNON EL-1530 | HLB: 17.4 | | | | | | | | | | |
| | | BLAUNON BN-3 | HLB: 9.6 | | | | | | | | | | |
| | | Lutensol XP30 | HLB: 9.1 | | | | | | | | | | |
| | | Lutensol XP50 | HLB: 11.6 | | | | | | | | | | |
| | | Lutensol XP100 | HLB: 14.7 | | | | | | | | | | |

-continued

| Water-soluble organic solvent | 1.2-PG | | 20 | 20 | 20 | 20 | 20 | 20 | 20 | 20 | 20 | 20 |
|---|---|---|---|---|---|---|---|---|---|---|---|---|
| | Ion exchanged water | | 36.5 | 36.3 | 36.1 | 34.8 | 34.6 | 35.1 | 35.9 | 35.7 | 33.6 | 32.6 |
| | Content of acetylene diol-based surfactant (A1) [ppm] | | 100 | 100 | 100 | 100 | 100 | 100 | 100 | 100 | 100 | 100 |
| | Content of acetylene diol-based surfactant (A2) | | 1.5 | 1.5 | 1.5 | 2 | 2 | 1.5 | 1 | 1 | 1.5 | 1.5 |
| | Amount ratio of [acetylene diol-based surfactant (A2)/ acetylene diol-based surfactant (A1)] | | 150 | 150 | 150 | 200 | 200 | 150 | 100 | 100 | 150 | 150 |
| | Amount ratio of [nonionic surfactant (B)/ acetylene diol-based surfactant (A2) + acetylene diol-based surfactant (A1)] | | 0.20 | 0.33 | 0.46 | 0.75 | 0.85 | 1.13 | 1.39 | 1.58 | 2.12 | 2.78 |
| | Mass factor-added HLB value | | 1.27 | 1.27 | 1.27 | 1.27 | 1.28 | 1.28 | 1.28 | 1.29 | 1.29 | 1.30 |

| | Ink No. | | 78 | 79 | 80 | 81 | 82 | 83 | 84 | 85 | 86 |
|---|---|---|---|---|---|---|---|---|---|---|---|
| Pigment dispersion | Cyan pigment dispersion 1 | Pigment concentration: 20% | 25.0 | 25.0 | 25.0 | 25.0 | 25.0 | 25.0 | 25.0 | 25.0 | 25.0 |
| Binder resin | Binder resin 1 water-based solution | Nv: 30% | 16.7 | 16.7 | 16.7 | 16.7 | 16.7 | 16.7 | 16.7 | 16.7 | 16.7 |
| Acetylene diol-based surfactant (A) | Un-modified acetylene diol-based surfactant (A1) | Un-modified acetylene diol-based compound 1 | HLB: 3.0 | 0.01 | 0.01 | 0.01 | 0.01 | 0.01 | 0.01 | 0.01 | 0.01 | 0.01 |
| | Alkylene oxide-modified acetylene diol-based surfactant (A2) | Modified acetylene diol-based compound 4 | HLB: 8.2 | 0.5 | 1.5 | 1.5 | 1.5 | 1.5 | 1.5 | 1.5 | 1.5 | 1.5 |
| Nonionic surfactant (B) | Silicon-based surfactant | BYK 349 | HLB: 10.2 | 2 | | | | | | | | |
| | | TEGO Glide 100 | HLB: 6.8 | 0.2 | | | | | | | | |
| | Polyoxyalkylene alkyl ether-based surfactant | BLAUNON EL-1502.2 | HLB: 6.3 | | 1.2 | | | | | | | |
| | | BLAUNON EL-1505 | HLB: 10.5 | | | 1.2 | | | | | | |
| | | BLAUNON EL-1515 | HLB: 14.9 | | | | 1.2 | | | | | |
| | | BLAUNON EL-1530 | HLB: 17.4 | | | | | 1.2 | | | | |
| | | BLAUNON BN-3 | HLB: 9.6 | | | | | | 1.2 | | | |
| | | Lutensol XP30 | HLB: 9.1 | | | | | | | 1.2 | | |
| | | Lutensol XP50 | HLB: 11.6 | | | | | | | | 1.2 | |
| | | Lutensol XP100 | HLB: 14.7 | | | | | | | | | 1.2 |
| Water-soluble organic solvent | 1.2-PG | | 20 | 20 | 20 | 20 | 20 | 20 | 20 | 20 | 20 |
| | Ion exchanged water | | 35.6 | 35.6 | 35.6 | 35.6 | 35.6 | 35.6 | 35.6 | 35.6 | 35.6 |
| | Content of acetylene diol-based surfactant (A1) [ppm] | | 100 | 100 | 100 | 100 | 100 | 100 | 100 | 100 | 100 |
| | Content of acetylene diol-based surfactant (A2) | | 0.5 | 1.5 | 1.5 | 1.5 | 1.5 | 1.5 | 1.5 | 1.5 | 1.5 |
| | Amount ratio of [acetylene diol-based surfactant (A2)/ acetylene diol-based surfactant (A1)] | | 50 | 150 | 150 | 150 | 150 | 150 | 150 | 150 | 150 |
| | Amount ratio of [nonionic surfactant (B)/ acetylene diol-based surfactant (A2) + acetylene diol-based surfactant (A1)] | | 4.31 | 0.79 | 0.79 | 0.79 | 0.79 | 0.79 | 0.79 | 0.79 | 0.79 |
| | Mass factor-added HLB value | | 1.30 | 1.28 | 1.28 | 1.28 | 1.28 | 1.28 | 1.28 | 1.28 | 1.28 |

-continued

| Ink No. | | | | 87 | 88 | 89 | 90 | 91 | 92 | 93 | 94 | 95 | 96 |
|---|---|---|---|---|---|---|---|---|---|---|---|---|---|
| Pigment dispersion | Cyan pigment dispersion 1 | | Pigment concentration: 20% | 25.0 | 25.0 | 25.0 | 25.0 | 25.0 | 25.0 | 25.0 | 25.0 | 25.0 | 25.0 |
| | Cyan pigment dispersion 2 | | Pigment concentration: 20% | | | | | | | | | | |
| Binder resin | Binder resin 1 water-based solution | | Nv: 30% | 16.7 | 16.7 | 16.7 | 16.7 | 16.7 | 16.7 | 16.7 | 16.7 | 16.7 | 16.7 |
| | Neocryl A-1127 | | Nv: 44% | | | | | | | | | | |
| | NeoRez R-600 | | Nv: 33% | | | | | | | | | | |
| Acetylene diol-based surfactant (A) | Un-modified acetylene diol-based surfactant (A1) | Un-modified acetylene diol-based compound 1 | HLB: 3.0 | 0.01 | 0.01 | 0.01 | 0.01 | 0.01 | 0.01 | 0.01 | 0.01 | 0.01 | 0.01 |
| | Alkylene oxide-modified acetylene diol-based surfactant (A2) | Modified acetylene diol-based compound 4 | HLB: 8.2 | 1.5 | 1.5 | 1.5 | 1.5 | 1.5 | 1.5 | 1.5 | 1.5 | 1.5 | 1.5 |
| Nonionic surfactant (B) | Silicon-based surfactant | BYK 349 | HLB: 10.2 | | | 0.5 | 1 | 1 | 1 | 1 | 1 | 1 | 1 |
| | | TEGO Glide100 | HLB: 6.8 | 0.2 | 0.2 | | 0.2 | 0.2 | 0.2 | 0.2 | 0.2 | 0.2 | 0.2 |
| | Poly-oxy-alkylene alkyl ether-based surfactant | BLAUNON EL-1502.2 | HLB: 6.3 | 1 | | | | | | | | | |
| | | Lutensol XP30 | HLB: 9.1 | | 1 | 1 | | | | | | | |
| Water-soluble organic solvent | Specific alkylene glycol ethers | 1.2-PG | | 20 | 20 | 20 | 2 | 5 | 10 | 15 | 30 | 40 | 45 |
| | | PGM | | | | | | | | | | | |
| | | BDG | | | | | | | | | | | |
| | | DPnP | | | | | | | | | | | |
| | Other water-soluble organic solvents | 1.3-PG | | | | | | | | | | | |
| | | 1.2-BD | | | | | | | | | | | |
| | Ion exchanged water | | | 35.6 | 35.6 | 35.3 | 53.6 | 50.6 | 45.6 | 40.6 | 25.6 | 15.6 | 10.6 |
| Content of acetylene diol-based surfactant (A1) [ppm] | | | | 100 | 100 | 100 | 100 | 100 | 100 | 100 | 100 | 100 | 100 |
| Content of acetylene diol-based surfactant (A2) | | | | 1.5 | 1.5 | 1.5 | 1.5 | 1.5 | 1.5 | 1.5 | 1.5 | 1.5 | 1.5 |
| Amount ratio of [acetylene diol-based surfactant (A2)/acetylene diol-based surfactant (A1)] | | | | 150 | 150 | 150 | 150 | 150 | 150 | 150 | 150 | 150 | 150 |
| Amount ratio of [nonionic surfactant (B)/ acetylene diol-based surfactant (A2) + acetylene diol-based surfactant (A1)] | | | | 0.79 | 0.79 | 0.99 | 0.79 | 0.79 | 0.79 | 0.79 | 0.79 | 0.79 | 0.79 |

| Ink No. | | | | 97 | 98 | 99 | 100 | 101 | 102 | 103 | 104 | 105 |
|---|---|---|---|---|---|---|---|---|---|---|---|---|
| Pigment dispersion | Cyan pigment dispersion 1 | | Pigment concentration: 20% | 25.0 | 25.0 | 25.0 | 25.0 | 25.0 | 25.0 | 25.0 | 25.0 | |

-continued

| | | | 1 | 2 | 3 | 4 | 5 | 6 | 7 | 8 | 9 |
|---|---|---|---|---|---|---|---|---|---|---|---|
| | Cyan pigment dispersion 2 | Pigment concentration: 20% | | | | | | | | | 25.0 |
| Binder resin | Binder resin 1 water-based solution | Nv: 30% | 16.7 | 16.7 | 16.7 | 16.7 | 16.7 | 16.7 | | | 16.7 |
| | Neocryl A-1127 | Nv: 44% | | | | | | | 16.7 | | |
| | NeoRez R-600 | Nv: 33% | | | | | | | | 16.7 | |
| Acetylene diol-based surfactant (A) | Unmodified acetylene diol-based surfactant (A1) | Unmodified acetylene diol-based compound 1 | HLB: 3.0 | 0.01 | 0.01 | 0.01 | 0.01 | 0.01 | 0.01 | 0.01 | 0.01 | 0.01 |
| | Alkylene oxide-modified acetylene diol-based surfactant (A2) | Modified acetylene diol-based compound 4 | HLB: 8.2 | 1.5 | 1.5 | 1.5 | 1.5 | 1.5 | 1.5 | 1.5 | 1.5 | 1.5 |
| Nonionic surfactant (B) | Silicon-based surfactant | BYK 349 | HLB: 10.2 | 1 | 1 | 1 | 1 | 1 | 1 | 1 | 1 | 1 |
| | | TEGO Glide100 | HLB: 6.8 | 0.2 | 0.2 | 0.2 | 0.2 | 0.2 | 0.2 | 0.2 | 0.2 | 0.2 |
| | Polyoxyalkylene alkyl ether-based surfactant | BLAUNON EL-1502.2 | HLB: 6.3 | | | | | | | | | |
| | | Lutensol XP30 | HLB: 9.1 | | | | | | | | | |
| Water-soluble organic solvent | Specific alkylene glycol ethers | 1.2-PG | | | | 10 | 15 | 15 | 15 | 20 | 20 | 20 |
| | | PGM | | | | 10 | 5 | | | | | |
| | | BDG | | | | | | 5 | | | | |
| | | DPnP | | | | | | | 5 | | | |
| | Other water-soluble organic solvents | 1.3-PG | | 20 | | | | | | | | |
| | | 1.2-BD | | | 20 | | | | | | | |
| | Ion exchanged water | | | 35.6 | 35.6 | 35.6 | 35.6 | 35.6 | 35.6 | 35.6 | 35.6 | 35.6 |
| | Content of acetylene diol-based surfactant (A1) [ppm] | | | 100 | 100 | 100 | 100 | 100 | 100 | 100 | 100 | 100 |
| | Content of acetylene diol-based surfactant (A2) | | | 1.5 | 1.5 | 1.5 | 1.5 | 1.5 | 1.5 | 1.5 | 1.5 | 1.5 |
| | Amount ratio of [acetylene diol-based surfactant (A2)/acetylene diol-based surfactant (A1)] | | | 150 | 150 | 150 | 150 | 150 | 150 | 150 | 150 | 150 |
| | Amount ratio of [nonionic surfactant (B)/acetylene diol-based surfactant (A2) + acetylene diol-based surfactant (A1)] | | | 0.79 | 0.79 | 0.79 | 0.79 | 0.79 | 0.79 | 0.79 | 0.79 | 0.79 |

Note that details of product names and abbreviations described in Table 2 above are as follows. Note that, in Table 2, "Nv" represents a solid content concentration, and "HLB" represents an HLB value.

NeoCryl A-1127 (acrylic emulsion manufactured by DSM, solid content concentration: 44%, MFT: 7° C.)

NeoRez R-600 (urethane emulsion manufactured by DSM, solid content concentration: 33%, MFT: lower than 0° C.)

BYK 349 (silicon-based surfactant manufactured by BYK-Chemie GmbH, HLB value=10.2)

BYK 3420 (silicon-based surfactant manufactured by BYK-Chemie GmbH, HLB value=13.8)

BYK 3451 (silicon-based surfactant manufactured by BYK-Chemie GmbH, HLB value=10.8)

TEGO Glide100 (silicon-based surfactant manufactured by Evonik, HLB value=6.8)

TEGO Glide440 (silicon-based surfactant manufactured by Evonik, HLB value=12.7)

TEGO Twin 4200 (silicon-based surfactant manufactured by Evonik, HLB value=8.2)

BLAUNON EL-1502.2 (polyoxyethylene lauryl ether manufactured by AOKI OIL INDUSTRIAL CO., LTD., HLB value=6.3)

BLAUNON EL-1505 (polyoxyethylene lauryl ether manufactured by AOKI OIL INDUSTRIAL CO., LTD., HLB value=10.5)

BLAUNON EL-1515 (polyoxyethylene lauryl ether manufactured by AOKI OIL INDUSTRIAL CO., LTD., HLB value=14.9)

BLAUNON EL-1530 (polyoxyethylene lauryl ether manufactured by AOKI OIL INDUSTRIAL CO., LTD., HLB value=17.4)

BLAUNON BN-3 (polyoxyethylene beta naphthol ether manufactured by AOKI OIL INDUSTRIAL CO., LTD., HLB value=9.6)
Lutensol XP30 (nonionic surfactant manufactured by BASF, HLB value=9.1)
Lutensol XP50 (nonionic surfactant manufactured by BASF, HLB value=11.6)
Lutensol XP100 (nonionic surfactant manufactured by BASF, HLB value=14.7)
1,2-PG (1,2-propanediol)
PGM (propylene glycol monomethyl ether)
BDG (diethylene glycol monobutyl ether)
DPnP (dipropylene glycol monopropyl ether)
1,3-PG (1,3-propanediol)
1,2-BD (1,2-butanediol)

Examples 1 to 93 and Comparative Examples 1 to 12

The inks prepared above were evaluated as follows. Evaluation results are as illustrated in Table 3.

<Evaluation 1: Beading (Solid Filling)>

An inkjet discharge apparatus equipped with a head (KJ4B-1200) manufactured by KYOCERA Corporation and installed in an environment of 25° C. was filled with each of the inks prepared above. A nozzle check pattern was printed, and it was confirmed that the ink was normally discharged from all the nozzles, and then the apparatus was allowed to stand for one minute. Thereafter, solid printing with a coverage rate of 100% was performed on a PET film (FE2001, thickness: 12 μm) manufactured by Futamura Chemical Co., Ltd. under printing conditions of a frequency of 40 kHz and 1200×1200 dpi, and then the printed film was dried in an air oven at 85° C. for one minute to obtain a solid printed matter. Then, by visually confirming the number of streaks (portions where the ink was not placed on a printing substrate and which look like streaks) present in the obtained solid printed matter, beading (solid filling) was evaluated. Evaluation criteria are as follows, and those evaluated as A, B, and C were defined as actually usable regions.

A: The number of streaks that could be visually confirmed was 5 or less.
B: The number of streaks that could be visually confirmed was 6 to 10 or less.
C: The number of streaks that could be visually confirmed was 11 to 20 or less.
D: The number of streaks that could be visually confirmed was 21 or more.

<Evaluation 2: Continuous Discharge Performance>

An inkjet discharge apparatus equipped with a head (KJ4B-1200) manufactured by KYOCERA Corporation was filled with each of the inks prepared above. A nozzle check pattern was printed, it was confirmed that the ink was normally discharged from all the nozzles, and then the ink was continuously discharged from all the nozzles for one hour under condition of a frequency of 40 kHz. Thereafter, a nozzle check pattern was printed again, and the number of nozzles (the number of nozzle failures) from which the ink was not discharged was confirmed to evaluate continuous discharge performance. Evaluation criteria are as follows, and those evaluated as AA, A, B, and C were defined as actually usable regions.

AA: There was no omitted nozzle at all.
A: The number of nozzle failures was 1 or 2.
B: The number of nozzle failures was 3 to 6.
C: The number of nozzle failures was 7 to 10.
D: The number of nozzle failures was 11.

<Evaluation 3: Blocking Resistance>

A solid printed matter having a coverage rate of 100% was obtained using the same printing conditions and printing substrate to Evaluation 1, and then the solid printed matter was cut into a 4 cm×4 cm square. In addition, a PET film used as a printing substrate (that had not been used for printing) was cut out in the same manner to the case of the solid printed matter. Then, the cut solid printed matter was superimposed on the PET film such that an ink layer of the cut solid printed matter faced a non-printed surface (rear surface) of the PET film. The resulting product was used as a test piece, and the test piece was subjected to a blocking test using a permanent strain tester. Environmental conditions of the blocking test were a load of 10 kg/cm$^2$, a temperature of 40° C., 80% RH, and a test period of 24 hours, and the load was applied using a constant load type permanent strain tester manufactured by TESTER SANGYO CO., LTD. After a lapse of 24 hours, the PET film was instantaneously pulled and peeled off while an angle of 90 degrees was maintained, and blocking resistance was evaluated from the degree of resistance felt when the PET film was peeled off, and the state of the ink layer after peeling (visual observation). Evaluation criteria are as follows, and those evaluated as AA, A, B, and C were defined as actually usable regions.

AA: The ink layer was not stripped off by the PET film, and there was no resistance when the PET film was peeled off.
A: The ink layer was not stripped off by the PET film, but there was slight resistance when the PET film was peeled off.
B: A phenomenon that the ink layer was stripped off by the PET film was observed in a portion of less than 5% of the total area of the ink layer.
C: A phenomenon that the ink layer was stripped off by the PET film was observed in a portion of 5% or more and less than 10% of the total area of the ink layer.
D: A phenomenon that the ink layer was stripped off by the PET film was observed in a portion of 10% or more of the total area of the ink layer.

<Evaluation 4: Migration Resistance>

A solid printed matter having a coverage rate of 100% was obtained using the same printing conditions and printing substrate to Evaluation 1. Subsequently, a solvent-free lamination adhesive ("EA-N373A/B" manufactured by Toyo Morton Co., Ltd.) was applied to a printed surface (ink layer side) of the prepared solid printed matter using a solvent-free test coater under conditions of a temperature of 60° C., an application speed of 50 m/min, and an application amount of 2 g/m$^2$. Furthermore, the solid printed matter was superimposed on a CPP film (non-stretched polypropylene film "FHK2" (thickness: 25 μm) manufactured by Futamura Chemical Co., Ltd.) such that the surface to which the solvent-free lamination adhesive was applied faced the corona treated surface of the CPP film, and then the resulting product was allowed to stand (aged) in an environment of 40° C. and 80% RH for one day to cure the solvent-free lamination adhesive composition, thus preparing a laminated product.

The laminated product obtained above was set in a migration cell ("MigraCell (registered trademark) MC60" manufactured by Gassner Glastechnik) such that the CPP film was on the upper side, and then 50 mL of a 95% ethanol solution was added thereto. Note that the contact area between the laminated product and ethanol was 0.5 dm$^2$. Thereafter, the migration cell was allowed to stand in an oven at 40° C. for ten days, and then the 95% ethanol solution was taken out and concentrated to 2 mL or less under conditions of 40° C. and 50 mmHg. Thereafter, when the amount of the ethanol solution after concentration was less than 2 mL, the ethanol solution was put into a volumetric flask having a volume of 2 mL, and the volumetric flask was filled up with 95% ethanol. Then, using the ethanol solution after concentration and fill-up as a sample, the amount (total amount) of the acetylene diol-based surfactant (A) contained in 1 mL of the ethanol solution after concentration and fill-up was quantified using a gas chromatograph mass spectrometer ("Agilent 7890 A/5975 C" manufactured by Agilet Technologies, Inc.), whereby migration resistance was evaluated. Evaluation criteria are as follows, and those evaluated as A, B, and C were defined as actually usable regions.

A: The elution amount of the acetylene diol-based surfactant (A) was 0.1 µg/mL or less.

B: The elution amount of the acetylene diol-based surfactant (A) was more than 0.1 µg/mL and 1.0 µg/mL or less.

C: The elution amount of the acetylene diol-based surfactant (A) was more than 1.0 µg/mL and 3.0 µg/mL or less.

D: The elution amount of the acetylene diol-based surfactant (A) was more than 3.0 µg/mL.

TABLE 3

| | Comparative Example 1 | Example 1 | Example 2 | Example 3 | Example 4 | Example 5 | Example 6 | Comparative Example 2 | Example 7a | Example 7 | Example 8 | Example 9 | Example 10 | Example 11 | Comparative Example 3 | Example 12 | Comparative Example 4 | Example 13 |
|---|---|---|---|---|---|---|---|---|---|---|---|---|---|---|---|---|---|---|
| Ink No. | 1 | 2 | 3 | 4 | 5 | 6 | 7 | 8 | 9a | 9 | 10 | 11 | 2 | 13 | 14 | 15 | 16 | 17 |
| Evaluation 1: beading (solid filling) | D | B | A | A | A | A | A | A | C | B | A | A | A | A | A | A | A | A |
| Evaluation 2: continuous discharge performance | B | B | AA | AA | A | B | B | D | B | B | AA | AA | B | B | C | B | D | AA |
| Evaluation 3: blocking resistance | A | A | A | A | A | B | C | D | A | A | A | A | A | B | D | C | D | A |
| Evaluation 4: migration resistance | A | A | A | A | A | B | C | D | A | A | A | A | A | B | C | C | D | A |

| | Example 14 | Example 15 | Example 16 | Example 17 | Example 18 | Example 19 | Example 20 | Example 21 | Example 22 | Comparative Example 5 | Comparative Example 6 | Comparative Example 7 | Comparative Example 8 | Example 23 | Example 24 | Example 25 | Example 26 | Comparative Example 27 |
|---|---|---|---|---|---|---|---|---|---|---|---|---|---|---|---|---|---|---|
| Ink No. | 18 | 19 | 20 | 21 | 22 | 23 | 24 | 25 | 26 | 27 | 28 | 29 | 30 | 31 | 32 | 33 | 34 | 35 |
| Evaluation 1: beading (solid filling) | A | A | A | A | A | B | B | A | A | D | D | D | D | B | A | A | A | A |
| Evaluation 2: continuous discharge performance | B | B | AA | AA | AA | A | A | AA | AA | C | C | D | D | B | A | A | AA | AA |
| Evaluation 3: blocking resistance | A | A | A | A | A | A | A | A | A | A | B | B | B | B | A | A | A | A |
| Evaluation 4: migration resistance | B | A | A | A | A | A | A | A | A | A | A | A | A | A | A | A | A | A |

| | Example 28 | Example 29 | Comparative Example 9 | Example 30 | Example 31 | Example 32 | Example 33 | Example 34 | Example 35 | Example 36 | Example 37 | Comparative Example 10 | Example 38a | Example 38 | Example 39 | Example 40 | Example 41 | Example 42 |
|---|---|---|---|---|---|---|---|---|---|---|---|---|---|---|---|---|---|---|
| Ink No. | 36 | 37 | 38 | 39 | 40 | 41 | 42 | 43 | 44 | 45 | 46 | 47 | 48a | 48 | 49 | 50 | 51 | 52 |
| Evaluation 1: beading (solid filling) | B | B | D | C | B | B | A | A | B | B | C | D | C | B | B | A | A | A |
| Evaluation 2: continuous discharge performance | B | B | C | C | B | A | A | A | B | A | B | C | B | B | B | AA | A | B |

TABLE 3-continued

| | | | | | | | | | | | | | | | | | |
|---|---|---|---|---|---|---|---|---|---|---|---|---|---|---|---|---|---|
| Evaluation 3: blocking resistance | B | B | D | B | A | A | A | A | B | B | C | D | B | C | B | A | A | B |
| Evaluation 4: migration resistance | A | A | A | A | A | A | A | A | A | A | A | A | A | A | A | A | A | A |

| | Comparative Example 11 | Comparative Example 12 | Example 43 | Example 44 | Example 45 | Example 46 | Example 47 | Example 48 | Example 49 | Example 50 | Example 51 | Example 52 | Example 53 | Example 54 | Example 55 | Example 56 | Example 57 | Example 58 |
|---|---|---|---|---|---|---|---|---|---|---|---|---|---|---|---|---|---|---|
| Ink No. | 53 | 54 | 55 | 56 | 57 | 58 | 59 | 60 | 61 | 62 | 63 | 64 | 65 | 66 | 67 | 68 | 69 | 70 |
| Evaluation 1: beading (solid filling) | D | D | B | A | A | A | A | A | A | A | A | A | A | A | A | B | B | B |
| Evaluation 2: continuous discharge performance | C | D | C | AA | A | AA | A | A | AA | AA | AA | AA | AA | AA | AA | B | B | A |
| Evaluation 3: blocking resistance | D | B | B | A | A | A | A | A | A | A | A | A | A | AA | AA | B | A | A |
| Evaluation 4: migration resistance | C | B | A | A | A | A | A | A | A | A | A | A | A | A | A | A | A | A |

| | Example 69 | Example 60 | Example 61 | Example 62 | Example 63 | Example 64 | Example 65 | Example 66 | Example 67 | Example 68 | Example 69 | Example 70 | Example 71 | Example 72 | Example 73 | Example 74 | Example 75 | Example 76 |
|---|---|---|---|---|---|---|---|---|---|---|---|---|---|---|---|---|---|---|
| Ink No. | 71 | 72 | 73 | 74 | 75 | 76 | 77 | 78 | 79 | 80 | 81 | 82 | 83 | 84 | 85 | 86 | 87 | 88 |
| Evaluation 1: beading (solid filling) | A | A | A | A | A | B | B | B | B | B | B | B | B | B | B | B | A | A |
| Evaluation 2: continuous discharge performance | AA | AA | A | B | B | B | B | C | B | A | C | C | A | A | A | C | B | A |
| Evaluation 3: blocking resistance | A | A | A | A | A | B | B | A | B | B | B | B | B | B | B | B | A | A |
| Evaluation 4: migration resistance | A | A | A | A | A | A | A | A | A | A | A | A | A | A | A | A | A | A |

| | Example 77 | Example 78 | Example 79 | Example 30 | Example 81 | Example 82 | Example 83 | Example 84 | Example 85 | Example 86 | Example 87 | Example 38 | Example 89 | Example 90 | Example 91 | Example 92 | Example 93 |
|---|---|---|---|---|---|---|---|---|---|---|---|---|---|---|---|---|---|
| Ink No. | 89 | 90 | 91 | 92 | 93 | 94 | 95 | 96 | 97 | 98 | 99 | 100 | 101 | 102 | 103 | 104 | 105 |
| Evaluation 1: beading (solid filling) | A | B | B | A | A | A | B | B | B | A | A | A | A | A | A | A | A |
| Evaluation 2: continuous discharge performance | A | C | B | AA | AA | A | B | B | A | A | AA | AA | AA | AA | A | A | AA |
| Evaluation 3: blocking resistance | A | A | A | A | A | B | B | B | B | A | A | A | A | AA | AA | A | |
| Evaluation 4: migration resistance | A | A | A | A | A | A | A | A | A | A | A | 4 | A | A | A | A | A |

As is apparent from Examples 1 to 93, by using the ink of the present invention containing the unmodified acetylene diol-based surfactant (A1) and the alkylene oxide-modified acetylene diol-based surfactant (A2) having an HLB value of 4 to 10 in predetermined amounts and blending ratios, and further containing a binder resin, it was possible to obtain a printed matter that is free from beading, has favorable solid filling, and is also excellent in blocking resistance and migration resistance. In addition, the aqueous inkjet ink of the present invention also had favorable continuous discharge performance.

The invention claimed is:

1. An aqueous inkjet ink comprising a pigment, a binder resin, a water-soluble organic solvent, and an acetylene diol-based surfactant (A), wherein
the acetylene diol-based surfactant (A) contains an unmodified acetylene diol-based surfactant (A1) and an alkylene oxide-modified acetylene diol-based surfactant (A2) having an HLB value of 4 to 10,
a content of the unmodified acetylene diol-based surfactant (A1) is 5 to 2,000 ppm with respect to a total amount of the aqueous inkjet ink,
a content of the alkylene oxide-modified acetylene diol-based surfactant (A2) is 0.2 to 5% by mass with respect to the total amount of the aqueous inkjet ink, and
a ratio between the content of the unmodified acetylene diol-based surfactant (A1) and the content of the alkylene oxide-modified acetylene diol-based surfactant (A2) [surfactant (A2)/surfactant (A1)] is within a range of 10 to 5,000.

2. The aqueous inkjet ink according to claim 1, further comprising a nonionic surfactant (B) other than the acetylene diol-based surfactant.

3. The aqueous inkjet ink according to claim 2, wherein a mass factor-added HLB value calculated by the following Formula (1) is 0.3 to 2.0

Formula (1):

[Mathematical Formula 1]

$$[\text{Mass factor} - \text{added } HLB \text{ value}] = \frac{\sum_{i=1}^{l}(HLB_i \times WT_i) + \sum_{j=1}^{m}(HLB_j \times WT_j)}{\sum_{k=1}^{n}(HLB_k \times WT_k)}$$

(wherein i represents a type of surfactant used as the unmodified acetylene diol-based surfactant (A1), and l represents the number of types of surfactants used as the unmodified acetylene diol-based surfactant (A1), j represents a type of surfactant used as the alkylene oxide-modified acetylene diol-based surfactant (A2), and m represents the number of types of surfactants used as the alkylene oxide-modified acetylene diol-based surfactant (A2), k represents a type of surfactant used as the nonionic surfactant (B), and n represents the number of types of surfactants used as the nonionic surfactant (B), $HLB_i$ represents an HLB value of the surfactant i, $WT_i$ represents a content (% by mass) of the surfactant i with respect to a total mass of the aqueous inkjet ink, $HLB_j$ represents an HLB value of the surfactant j, $WT_j$ represents a content (% by mass) of the surfactant j with respect to the total mass of the aqueous inkjet ink, $HLB_k$ represents an HLB value of the surfactant k, and $WT_k$ represents a content (% by mass) of the surfactant k with respect to the total mass of the aqueous inkjet ink).

4. The aqueous inkjet ink according to claim 2, wherein the nonionic surfactant (B) contains a silicon-based surfactant.

5. The aqueous inkjet ink according to claim 1, wherein the water-soluble organic solvent contains 1,2-propanediol, and a content of the 1,2-propanediol is 5 to 30% by mass with respect to the total amount of the aqueous inkjet ink.

6. A printed matter obtained by printing the aqueous inkjet ink according to claim 1 on a printing substrate.

* * * * *